US010452321B2

(12) United States Patent
Hayasaka et al.

(10) Patent No.: US 10,452,321 B2
(45) Date of Patent: Oct. 22, 2019

(54) STORAGE SYSTEM AND CONTROL METHOD THEREFOR

(71) Applicant: Hitachi, Ltd., Tokyo (JP)

(72) Inventors: Mitsuo Hayasaka, Tokyo (JP);
Kazumasa Matsubara, Tokyo (JP);
Masanori Takada, Tokyo (JP);
Yoshihiro Yoshii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 84 days.

(21) Appl. No.: 15/537,895

(22) PCT Filed: Jan. 23, 2015

(86) PCT No.: PCT/JP2015/051921
§ 371 (c)(1),
(2) Date: Jun. 20, 2017

(87) PCT Pub. No.: WO2016/117129
PCT Pub. Date: Jul. 28, 2016

(65) Prior Publication Data
US 2017/0344313 A1 Nov. 30, 2017

(51) Int. Cl.
*G06F 3/06* (2006.01)
*G06F 3/08* (2006.01)
*G06F 11/20* (2006.01)

(52) U.S. Cl.
CPC ............ *G06F 3/08* (2013.01); *G06F 3/0607* (2013.01); *G06F 11/2015* (2013.01);
(Continued)

(58) Field of Classification Search
CPC .......... G06F 3/08; G06F 11/00; G06F 3/0607; G06F 3/0653; G06F 3/067; G06F 11/2084; G06F 11/2015; G06F 11/2058
See application file for complete search history.

(56) References Cited

U.S. PATENT DOCUMENTS 7,730,153 B1    6/2010 Gole et al.
7,886,182 B1 *  2/2011 Coatney .............. G06F 11/2028
                                                714/11
(Continued)

FOREIGN PATENT DOCUMENTS

JP   2002-099390 A   4/2002
JP   2006-277205 A   10/2006
JP   2010-152747 A   7/2010

OTHER PUBLICATIONS

International Search Report of PCT/JP2015/051921 dated Apr. 14, 2015.

*Primary Examiner* — Hiep T Nguyen
(74) *Attorney, Agent, or Firm* — Mattingly & Malur, PC

(57) ABSTRACT

A storage system has a cluster structure in which a node is connected with a different node, the node having a volatile memory for storing first update data from a host and a first non-volatile memory for storing second copy data of second update data from the host to the different node, and having a copy management processing unit for storing first copy data of the first update data into a second non-volatile memory of the different node, and a storage service processing unit for transmitting, to the host, a response with respect to an update request of the first update data in response to the storage of the first copy data of the first update data by the copy management processing unit into the second non-volatile memory of the different node.

6 Claims, 20 Drawing Sheets

(52) U.S. Cl.
CPC ...... *G06F 11/2058* (2013.01); *G06F 11/2084* (2013.01); *G06F 3/067* (2013.01); *G06F 3/0653* (2013.01)

(56) References Cited

U.S. PATENT DOCUMENTS

| | | | | |
|---|---|---|---|---|
| 2004/0148486 | A1* | 7/2004 | Burton | G06F 11/1666 711/202 |
| 2006/0221393 | A1 | 10/2006 | Takaki | |
| 2010/0306488 | A1* | 12/2010 | Stroberger | G06F 11/2064 711/162 |
| 2012/0166886 | A1* | 6/2012 | Shankar | G06F 11/2028 714/43 |
| 2016/0004721 | A1* | 1/2016 | Iyer | G06F 17/30212 707/649 |
| 2016/0239395 | A1* | 8/2016 | Madsen | G06F 11/2069 |
| 2017/0308319 | A1* | 10/2017 | Suzuki | G06F 12/00 |

* cited by examiner

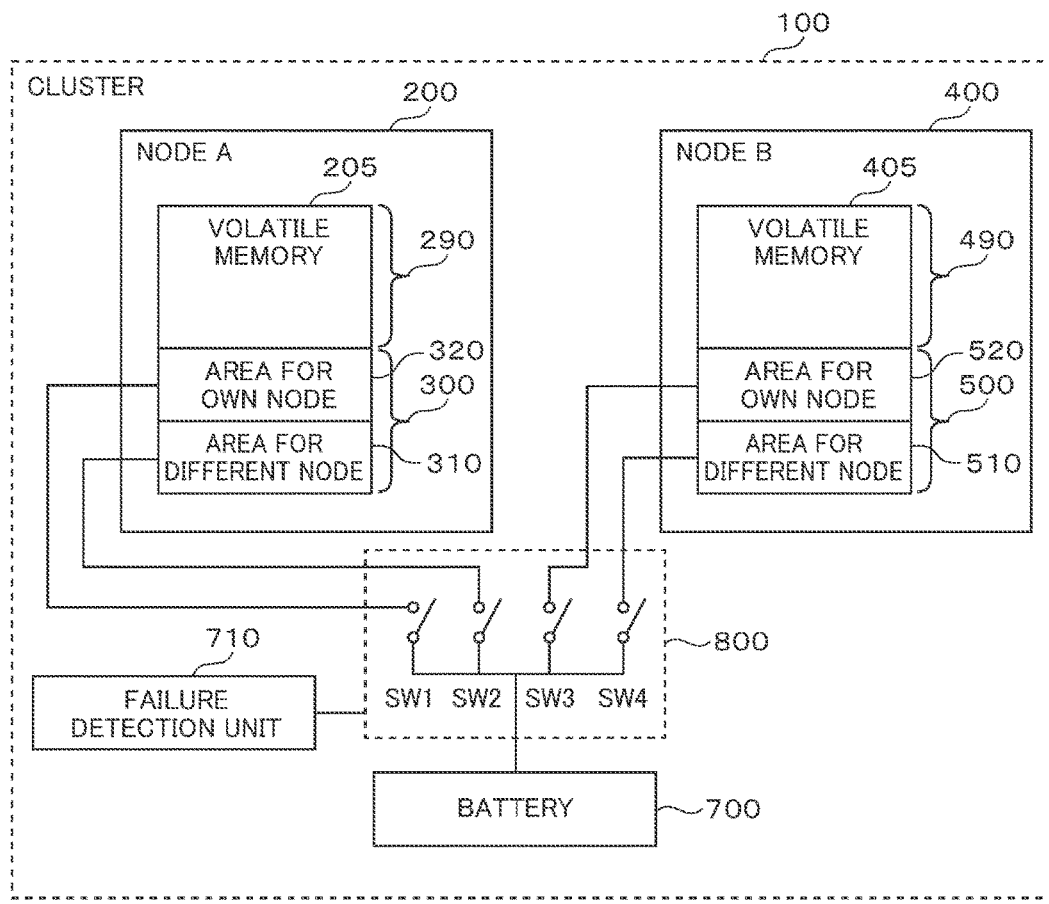

F I G. 6A

| 230 | 231 LATEST | 232 OLDEST NOT-YET-WRITTEN |
|---|---|---|
| REST POINT NUMBER | 3 | 2 |

F I G. 6B

| 240 # | 241 REST POINT NUMBER | 242 OPERATION |
|---|---|---|
| 1 | 1 | Write (Data A) |
| 2 | 2 | Write (Data C) |
| 3 | 2 | Write (Data E) |
| 4 | 3 | Write (Data D) |
| 5 | ... | ... |

F I G. 6C

| 250 | 251 LATEST | 252 OLDEST NOT-YET-WRITTEN |
|---|---|---|
| REST POINT NUMBER | 3 | 2 |

F I G. 6 D

| # | REST POINT NUMBER | OPERATION |
|---|---|---|
| 1 | 1 | Write (Data A) |
| 2 | 2 | Write (Data C) |
| 3 | 2 | Write (Data E) |
| 4 | 3 | Write (Data D) |
| 5 | | |

260, 261, 262

F I G. 7 A

| # | NODE NAME | SAVE DATA STORAGE VOLUME | SAVE DATA STORAGE PATH |
|---|---|---|---|
| 1 | NODE A | Volume0 | /foo |
| 2 | NODE B | Volume0 | /bar |
| 3 | ⋮ | ⋮ | ⋮ |
| ⋮ | ⋮ | ⋮ | ⋮ |

270, 271, 272, 273

F I G. 7 B

| # | NODE NAME | STATE | TAKEN-OVER NODE | DIRECT WRITE MODE | RECOVERY MODE |
|---|---|---|---|---|---|
| 1 | NODE A | RUNNING | NODE C | OFF | FAILOVER MODE |
| 2 | NODE B | RUNNING | | | |
| 3 | NODE C | STOPPED | | | |
| ⋮ | ⋮ | ⋮ | | | |

280, 281, 282, 283, 284, 285

F I G. 1 2 A
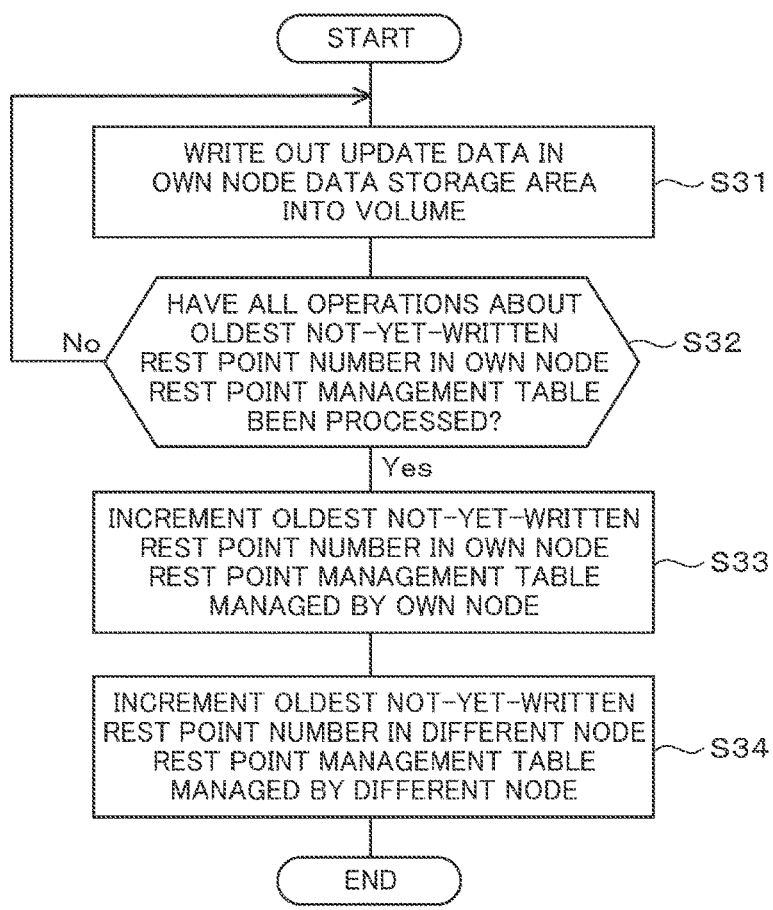
F I G. 1 2 B
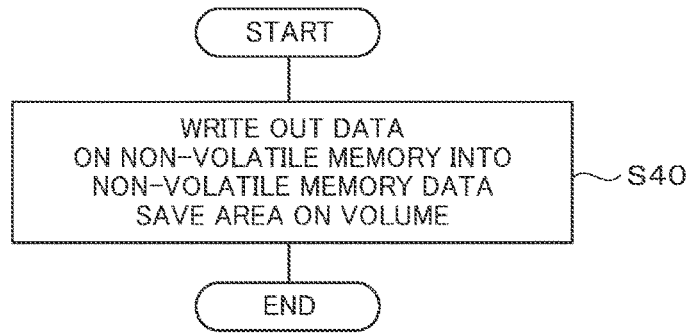

F I G. 1 5
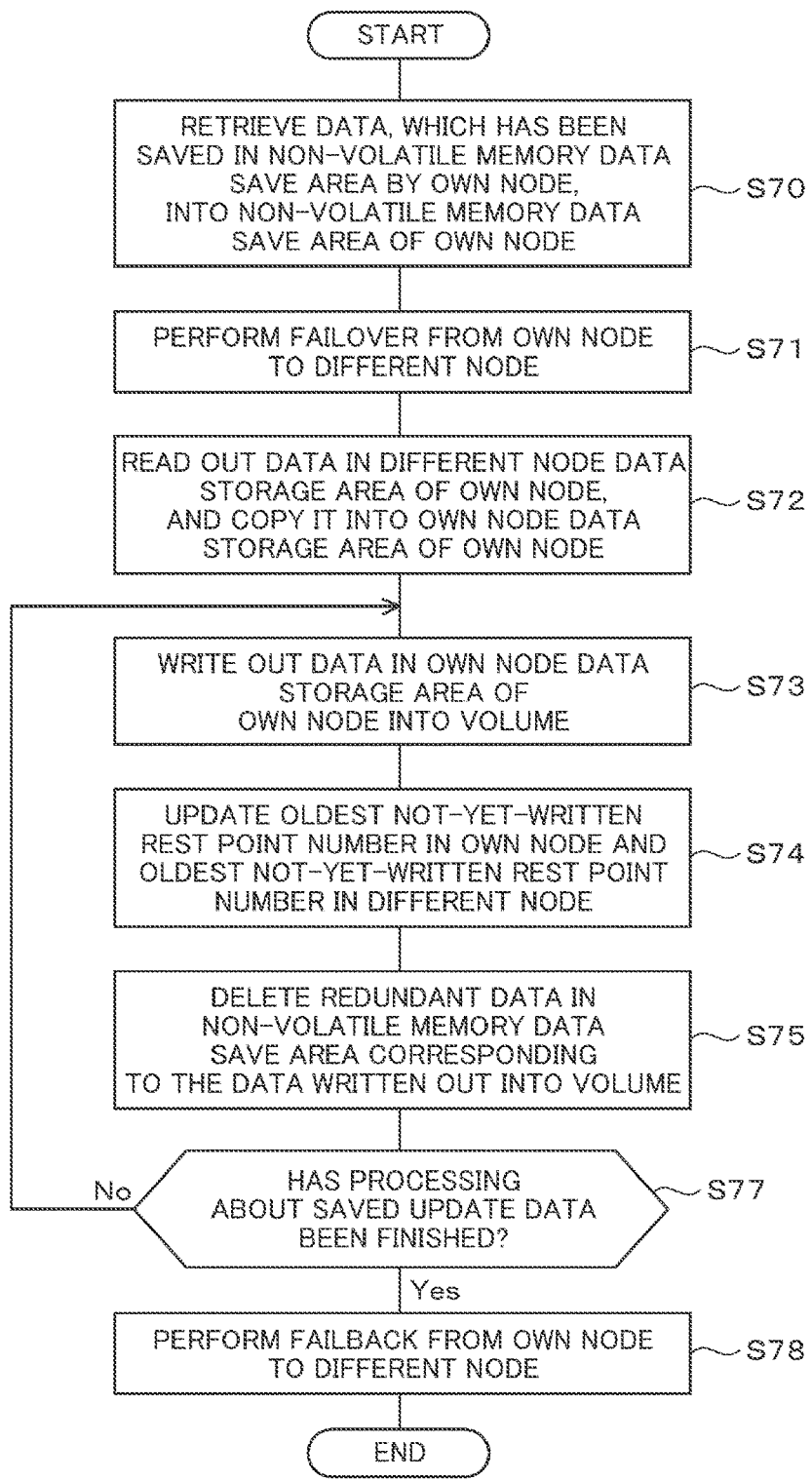

STORAGE SYSTEM AND CONTROL METHOD THEREFOR

TECHNICAL FIELD

The present invention relates to a storage system including a storage control device and to a control method for the storage system.

BACKGROUND ART

As a technology for improving the performance of a storage control device (referred to as a node hereinafter), Patent Literature 1 discloses a technology in which, if update data transmitted from a host is stored into the non-volatile memory area of the node, it is promptly assumed that processing relevant to the update data is completed regardless of whether the data of a storage device is updated or not. The target of this technology is a storage system of an HA (high availability) structure including a two-node cluster. Each node has a non-volatile memory, and two areas, that is, an area for storing data of its own and an area for storing data of a different node on the non-volatile memory. Each node that receives update data from a host (host computer) stores the update data into an own node data storage area on a non-volatile memory of its own, and copies the update data into a different node data storage area on a no-volatile memory of the different node. After the copy of the update data is finished, the node that received the update data informs the host of the completion of the processing.

As mentioned above, in the technology disclosed in Patent Literature 1, the completion of the processing can be reported to the host if update data is stored into the non-volatile memory before the update data is written out into the storage device. In addition, owing to the duplication of the update data achieved by the copy of the update data, even if one of the two nodes is broken down, the different node can take over the processing of the one node.

CITATION LIST

Patent Literature

Patent Literature 1: U.S. Pat. No. 7,730,153

SUMMARY OF INVENTION

Technical Problem

A non-volatile memory is more expensive than a volatile memory, so that the usage of the non-volatile memory leads to a low cost-effectiveness. Therefore, a technology has been proposed in which a specified area of a volatile memory is battery-backed-up so as to be used in the same way as a non-volatile memory is used. Even if this technology is adopted, a battery is also expensive and the cost-effectiveness of the usage of this technology is low, therefore it is necessary to use a battery with the minimum necessary capacity. Especially, in a system of a cluster structure, because it is necessary to increase the capacities of non-volatile memories in accordance with the number of nodes, even if the battery backup is adopted, it is required to limit the capacity of a battery to a small amount.

Solution to Problem

A storage system to be disclosed has a cluster structure in which a node is connected to a different node, the node has a volatile memory for storing first update data from a host and a first non-volatile memory for storing second copy data of second update data from the host to the different node, and the node further has a copy management processing unit for storing first copy data of the first update data into a second non-volatile memory of the different node, and a storage service processing unit for transmitting, to the host, a response with respect to an update request of the first update data in response to the storage of the first copy data of the first update data by the copy management processing unit into the second non-volatile memory of the different node.

Advantageous Effects of Invention

According to a storage system to be disclosed, the capacity of a volatile memory to be battery backed-up and the capacity of a non-volatile memory can be limited to small amounts.

BRIEF DESCRIPTION OF DRAWINGS

FIG. 1 A diagram showing a configuration for battery backed-up volatile memories of a storage system.
FIG. 2 A table showing the states of a switch.
FIG. 6A An example of an own node rest point management table.
FIG. 6B An example of an own node operation management table.
FIG. 6C An example of a different node rest point management table.
FIG. 6D An example of a different node operation management table.
FIG. 7A An example of a data save place management table.
FIG. 7B An example of a node state management table.
FIG. 12A The processing flowchart of a copy management processing unit in which update data is asynchronously written out into a volume.
FIG. 12B The processing flowchart of a redundant processing unit.
FIG. 15 Another flowchart of pieces of recovery processing of the data saved in the volume.

DESCRIPTION OF EMBODIMENTS

Figure 3:
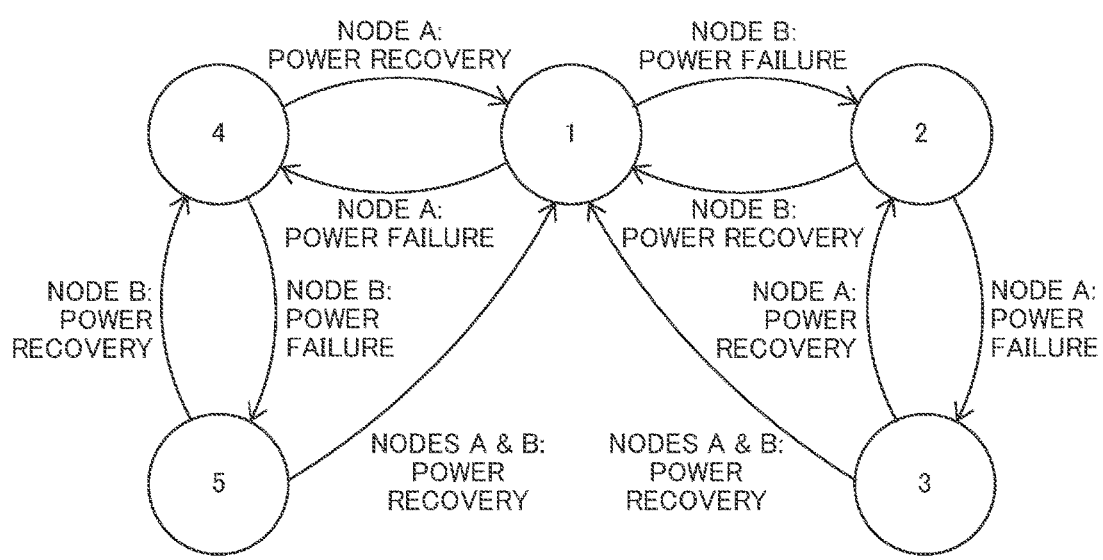
FIG. 3 The state transition diagram of the switch.

Several embodiments will be explained with reference to the accompanying drawings.

In the following explanations, although various kinds of information will be explained using representations such as "XX table", the various kinds of information can also be represented by data structures other than tables. In order to show that a kind of information can be explained regardless of a data structure, "XX table" is often referred to as "XX information".

Furthermore, although there is a case where processing is explained using a program as the subject of a sentence for the explanation of the processing, because the program is executed by hardware itself or by a processor (for example, an MP (Micro Processor)) included in the hardware, and predefined processing is executed properly using a storage resource (for example, a memory) and/or a communication interface device (for example, a port), it is conceivable that the hardware is treated as the subject of the sentence for the explanation. In addition, a program source can be a program distribution server or a storage medium.

Furthermore, in the following explanations, a state in which the consistency of an application or a file system is ensured will be referred to as a rest point. There is one or two rest points or more, and each rest point is given a rest point number for management.

First Embodiment

FIG. 1 is a diagram showing a configuration for battery backed-up volatile memories of a storage system. In FIG. 1, in order to clearly explain the battery backup of the volatile memories, configurations used for operations other than the battery backup are not shown.

The storage system has a two-node cluster structure including a node A 200 and a node B 400. The node A 200 includes a volatile memory 205, and the node B 400 includes a volatile memory 405. The volatile memory 205 has an area 290 which cannot be battery backed-up and an area 300 which can be battery backed-up. The volatile memory 405 has an area 490 which cannot be battery backed-up and an area 500 which can be battery backed-up. The area 300 includes an area 320 for its own node and an area 310 for a different node. Similarly, the area 500 includes an area 520 for its own node and an area 510 for the different node. Because these battery-backupable areas are connected to a battery 700 via a switch 800 controlled by a failure detection unit 710 when a failure such as a power failure occurs, these battery-backupable areas are supplied with electric source (electric power/electricity) from the battery 700, so that these areas can hold data (information). In other words, because the battery-backupable areas can hold data (information) even when a failure such as a power failure occurs, they operate as non-volatile memories. As a concrete example of a battery-backupable area, there is a battery-backup type NVRAM (Non-Volatile Random Access Memory) or the like. Here, an input to a failure detection unit 710 is not shown in FIG. 1.

The switch 800 includes SW1, SW2, SW3, and SW4. When SW1 is ON (conductive), the area 320 for its own node operates as a non-volatile memory owing to the battery backup. When SW2 is ON, the area 310 for the different node operates as a non-volatile memory owing to the battery backup. When SW3 is ON, the area 520 for its own node operates as a non-volatile memory owing to the battery backup. When SW4 is ON, the area 520 for the different node operates as a non-volatile memory owing to the battery backup.

FIG. 2 is a table showing the states of the switch 800 (states shown by the combinations of SW1, SW2, SW3, and SW4). FIG. 3 is the state transition diagram of the switch 800. The switch 800 shows states 1 to 5. Although there may be states other than the states 1 to 5 depending on the combinations of SW1, SW2, SW3, and SW4, it is conceivable that the state of the switch 800 is prevented from transiting to states other than the states 1 to 5 through controlling by the failure detection unit 710. In FIG. 2, a sign "-" denotes that the relevant one of SW1 to SW4 can be ON or OFF. In consideration of the power consumption of the battery 700, it is desirable that the sign "-" should be set OFF.

State 1 is the state of the switch 800 in which both node A 200 and node B 400 are normal. State 2 is the state of the switch 800 to which the switch 800 transits from State 1 in response to the detection of a failure (power failure or the like) of the node B 400, and it is a state in which SW1 and SW2 can be ON or OFF. In response to the detection of the failure (power failure or the like) of the node A 200 when the switch 800 is in State 2, the switch 800 transits to State 3. State 3 is the state of the switch 800 in which SW1 and SW2 are ON. State 4 is the state of the switch 800 to which the switch 800 transits from State 1 in response to the detection of the failure (power failure or the like) of the node A 200, and it is a state in which SW3 and SW4 can be ON or OFF. In response to the detection of the failure (power failure or the like) of the node B 400 when the switch 800 is in State 4, the switch 800 transits to State 5. State 5 is the state of the switch 800 in which SW3 and SW4 is ON. Although both node A 200 and node B 400 are broken down in State 3 and State 5, the failure detection unit 710 controls the states as different states from each other depending on the failure of which node the failure detection unit detects first.

Because usually the power supplies of the node A 200 and node B 400 are provided from different systems respectively, there are many cases where the failure such as power failure of only one of the nodes is detected, but in some cases the power failures of both nodes A 200 and B 400 are detected at the same time owing to the common cause (for example, a power failure across a wide range or across the entirety of a center where the storage system is installed) although the power supplies are provided from the different systems. Although it has been explained that it is desirable that the sign "-" in FIG. 2 should be set OFF in consideration of the power consumption of the battery 700, it is desirable that the sign "-" should be set ON in consideration of the occurrence of such a power failure. This is because there is a possibility that data stored in the battery-backupable areas 300 and 500 are lost during the time period from the detection of the power failure to the completion of the battery backup.

However, if the power supplies of the node A 200 and the node B 400 are normal (State 1), it is all right if the area 310 for the battery-backupable area 300 and the areas 510 for the battery-backupable area 500 are battery backed-up.

Hereinafter, under the assumption that the area 310 for the different node and the areas 310 and 510 for the different node are battery backed-up, the following descriptions are made while the areas 300 and 500, which can operate as non-volatile memories owing to the battery backup, is referred to as non-volatile memories respectively.

Figure 4:
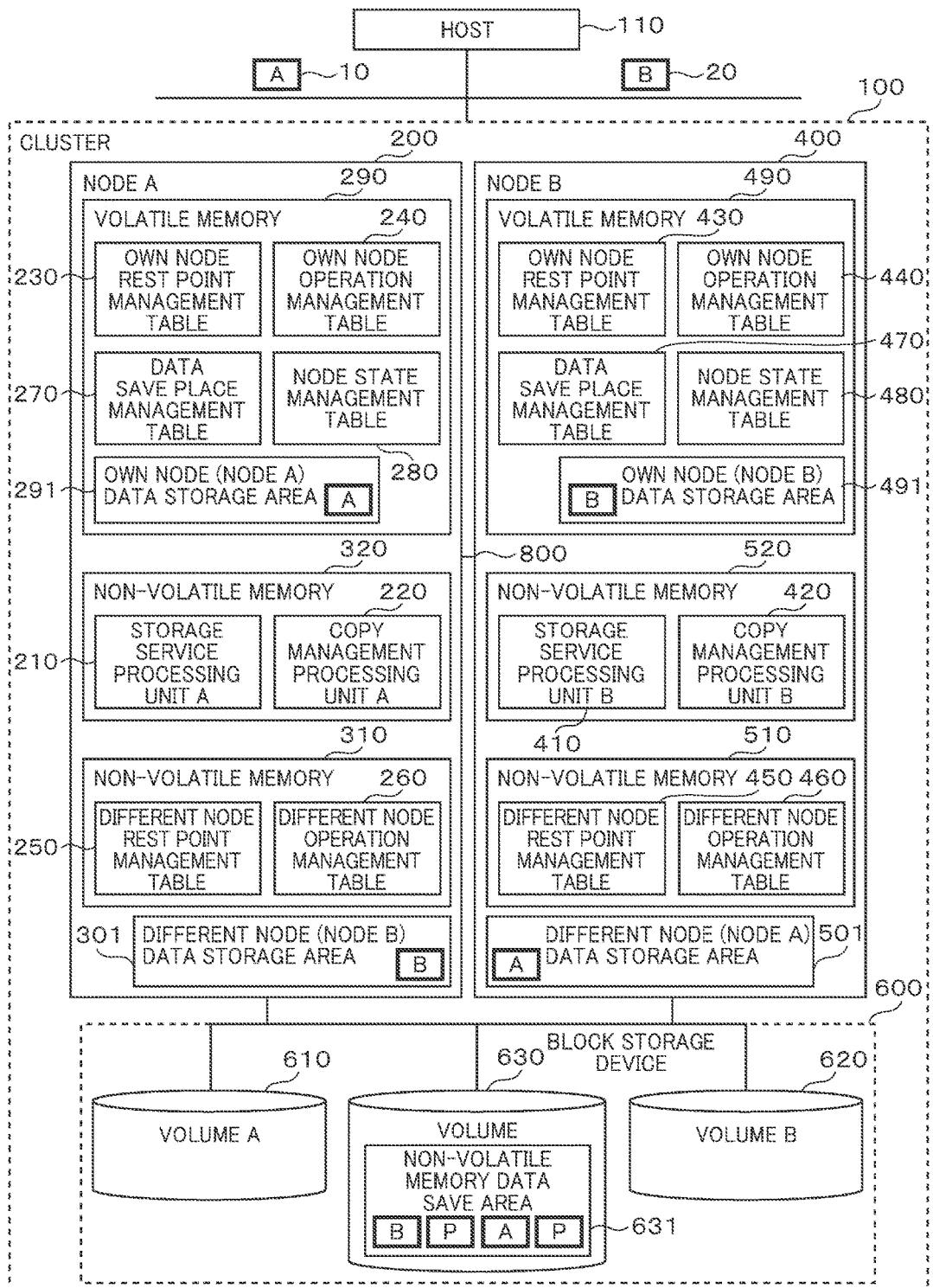
FIG. 4 A schematic block diagram showing the storage system of a first embodiment.

FIG. 4 is a schematic block diagram showing the storage system. As described as above, the storage system includes the node A (file storage device A) 200 and the node B (file storage device B) 400, and further includes a storage device (a block storage device) 600, and forms a cluster 100.

The node A 200 has a storage service processing unit A 210 and a copy management processing unit A 220 on the non-volatile memory 320. Similarly, the node B 400 has a storage service processing unit B 410 and a copy management processing unit B 420 on the non-volatile memory 520. Hereinafter, the operations of the above two processing units of the node A 200 will be explained as representative processing units.

The storage service processing unit A 210 of the node A 200 receives a data update request including update data A10 from a host 110. Here, the "update" of data includes the "storage" of new data. The storage service processing unit A 210 stores the update data A10 into the own node (node A) data storage area 291 on the volatile memory 290. The copy management processing unit A 220 controls the copy management processing unit B 420 via a communication channel 800 between the node A and the node B, and makes the copy management processing unit B 420 copy the update data A10 into a different node (node A) data storage area 501 on the non-volatile memory 510 of the node B 400, and register an operation (WRITE) regarding the update data A10 included in the received data update request on a different node operation management table 460. The copy management processing unit A 220 registers the operation (WRITE) regarding the update data A10 on an own node operation management table 240, transmits a response corresponding to the data update request from the host 110 to the host 110, and finishes the entire processing.

The copy management processing unit A 220 performs an operation in the own node operation management table 240 corresponding to the oldest not-yet-written rest point number (described later) in an own node rest point management table 230 stored in the volatile memory 290 in any of the cases where the data amount of data stored in the different node data storage area 501 of the non-volatile memory 510 of the node B 400 exceeds a predefined amount, where a predefined time passes since the data is stored, and where the copy management processing unit A 220 receives a compulsory write-out request from the host 110 with reference to the own node operation management table 240, and the copy management processing unit A 220 writes out the data into the volume A 610 of the block storage device 600. With this, the data (the update data A10 in this example) stored in the own node data storage area 291 on the volatile memory 290 is written out into the volume A 610. After the writing-out of the data is finished, the copy management processing unit A 220 updates the oldest not-yet-written rest point number on the own node rest point management table 230, and controls the copy management processing unit B 420, and makes the copy management processing unit B 420 update the oldest not-yet-written rest point number on a different node rest point management table 450 stored in the non-volatile memory 510 of the different node 400.

When one node is broken down, the different node performs processing of the processing units of the broken-down node, that is, takes over the services of the broken-down node. This is referred to as a failover. For example, if only the node A 200 is broken down, the storage service processing unit A 210 and the copy management processing unit A 220 that were running on the node A 200 are executed on the non-volatile memory 520 of the node B 400. In this case, the node B 400 takes over the services with reference to the different node rest point management table 450, the different node operation management table 460, and the different node (node A) data storage area 501 on the non-volatile memory 510.

In the case where all the nodes are broken down owing to a power failure or the like before data in the own node data storage area 291 on the volatile memory 290 is written out into the volume A 610, the copy management processing unit A 220 of the node A 200 writes out data stored in a different node data storage area 301 on the non-volatile memory 310 into a non-volatile memory data save area 631 of a volume 630 after performing data protection processing on the data. The data protection processing is processing of mirroring the same data, processing of writing out data to which parity codes are added, or the like. The non-volatile memory save area 631 can reside in any location as long as it is accessible from each node (in FIG. 4, the non-volatile memory save area 631 resides in the volume 630 in the storage device).

When the storage service processing unit A 210 of the node A 200 receives a data reference request from the host 110, if there is the relevant reference data in the own node (node A) data storage area 291 on the volatile memory 209, the storage service processing unit A 210 transmits the reference data to the host 110, and if there is not, the storage service processing unit A 210 reads the data from the volume A 610, transmits the data to the host 110, and finishes this processing.

According to this embodiment, while data protection is executing, the response capability in response to the data update request from the host 110 can be improved. In addition, with the use of the volatile memories 290, 490, the non-volatile memories 310, 510, and the non-volatile memory save area 631, the capacities of the non-volatile memories 300 and 500 can be reduced. In other words, in comparison with the case where the volatile memories are not used, it is not necessary to secure capacities equal to the capacities of the volatile memories 290 and 490 in the capacities of the non-volatile memories 310 and 510 respectively. This shows that, in the storage system of an HA structure, it is not necessary for each of the nodes 200 and 400 to secure the capacities of non-volatile memories for the two nodes (the capacities of data storage areas for its own node and the different node), and that it is sufficient that the node 200 and the node 400 secure the capacity of a non-volatile memory equal to the capacity of the different node data storage area 301 and the capacity of a non-volatile memory equal to the capacity of the different node data storage area 501 respectively. Therefore, the capacity of the battery 700 can be reduced, and the cost of the battery 700 can also be reduced.

Figure 5:
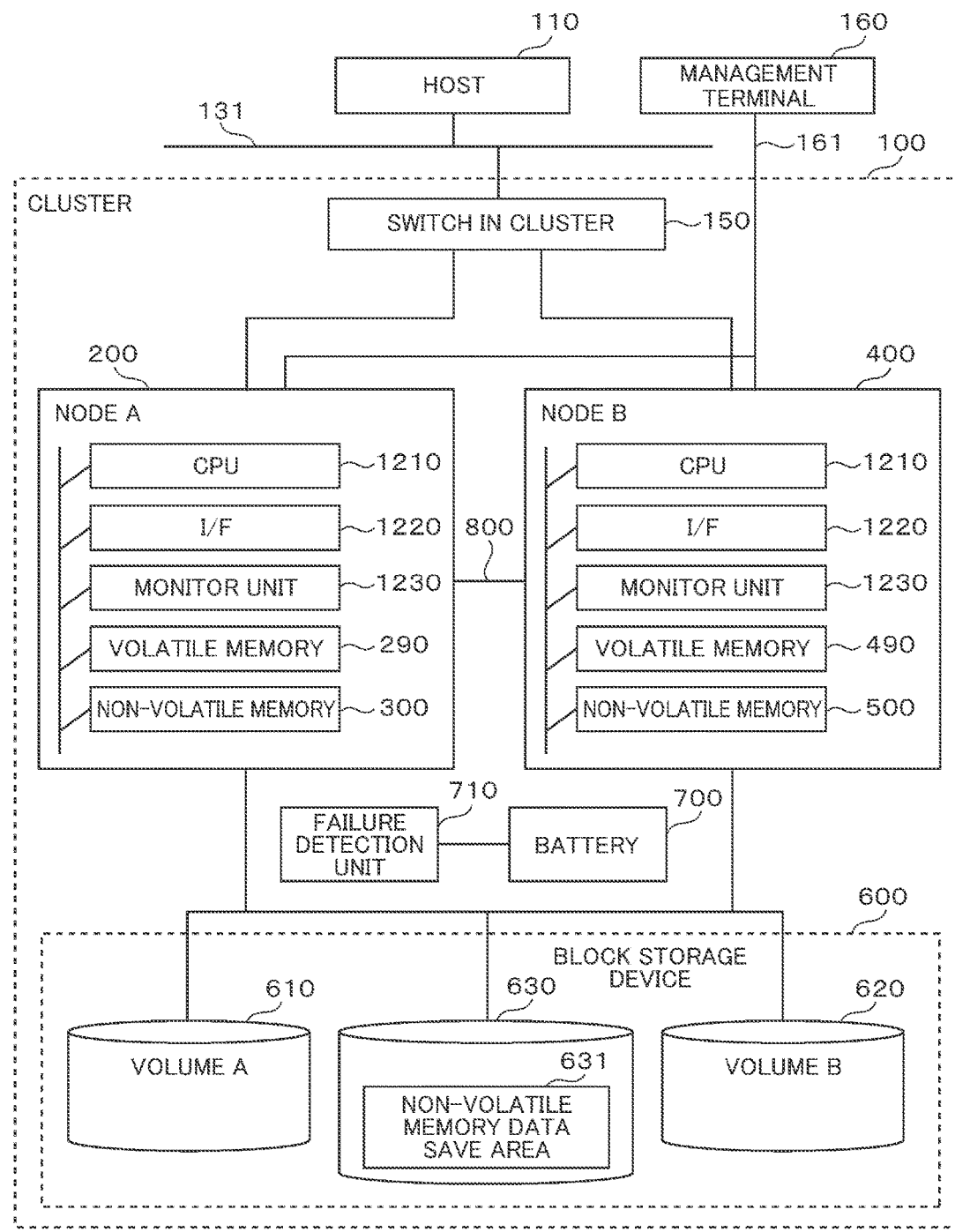
FIG. 5 The hardware block diagram of the storage system.

FIG. 5 is the hardware block diagram of the storage system. The cluster 100 is a storage system comprised of two nodes that is, the node A 200 and the node B 400 that are connected to the host 110 via a network 131. Furthermore, each node is connected to a management terminal 160 via a dedicated network 161. Each of the network 131 and the network 161 can be a WAN (wide area network), LAN (local area network), an Internet, a public line, or a dedicated line. A switch 150 in the cluster sorts data transferred from the host 110 into the node A 200 and the node B 400.

The node A 200 is a storage control device that receives a data update request from the host 110, and writes out data requested by the data update request into the block storage device 600. A CPU 1210 executes processing of the processing units stored in the non-volatile memory 320.

A monitor unit 1230 detects the states (running states or stopped states) of its own node (node A 200) and the different node (node B 400), rewrites a node state management table 280, and, if battery backup is necessary, informs the failure detection unit 710 of monitor results, and at the same time the monitor unit 1230 manages the executions of respective processing units corresponding to the states of the nodes. The monitor unit 1230 of the node A 200 and a monitor unit 1430 of the node B 400 detect the node state of the node B 400 and the node state of the node A 200 respectively using heartbeat detection or the like, and update the node state management tables 280 and 480 of their own respectively. In addition, when a failure is detected, the monitor unit 1230 controls the execution of the copy management processing unit 220, and the monitor unit 1430 controls the execution of the copy management processing unit 420. The failure detection unit 710, which is informed of the monitor results by the monitor unit 1230, controls the switch 800 as described above.

Tables that are stored in the volatile memory 290 are the own node rest point management table 230, the own node operation management table 240, a data save place management table 270, and the node state management table 280. The non-volatile memory 300 includes the area 320 for its own node and the area 310 for the different node as shown in FIG. 1. These areas are also referred to as non-volatile memories. Tables stored in the no-volatile memory 310 are a different node rest point management table 250 and a different node operation management table 260. Although the following descriptions and diagrammatic representations are given under the assumption that the data save place management table 270 and the node state management table 280 reside on the volatile memory 290, it is conceivable that these tables reside on any of the non-volatile memory 320, a volume 610, a volume 620, and the volume 630. Furthermore, the volatile memory 290 and the non-volatile memory 300 respectively include areas necessary for the executions of respective processing units (for example, working areas).

Because the same things that are true of the node A is equally true of the node B 400 except for the fact that the own node is the node B, and the different node is the node A, explanations about the node B 400 will be omitted.

The management terminal 160 is a terminal including an input/output device used for acquiring management information about the node A 200 and the node B 400 as needed, and for handling the node A 200 and the node B 400.

The block storage device 600 stores data in accordance with controls issued from the node A 200, the node B 400, the host 110, and the management terminal 160. Therefore, the block storage device 600 includes the volume A 610 and the volume B 620 for storing data. In addition, the block storage device 600 includes the volume 630 for saving various data including tables stored in the non-volatile memories 300 and 500 in case of failure, and the volume 630 includes the non-volatile memory data save area 631.

FIG. 6A shows an example of the own node rest point management table 230 or an example of an own node rest point management table 430. The own node rest point management table 230 will be described as a representative of the above two management tables. The own node rest point management table 230 stores the latest rest point number 231 and the oldest not-yet-written rest point number 232 of its own node.

The latest rest point number 231 is a number for managing an operation generation (a block of operations each of which updates data in the volume A 610 is referred to as a generation). When the copy management processing unit A 220 registers a data update operation received from the host 110 on the own node operation management table 240, the copy management processing unit A 220 registers the data update operation after attaching the latest rest point number 231 to the data update operation. Therefore, when the number of operations the own node receives exceeds a predefined number, or when a predefined time passes after an operation is registered, the copy management processing unit 220 increments (updates) the latest rest point number 231.

The oldest not-yet-written rest point number 232 shows the oldest rest point number an operation (data update of the volume A 610) about which has not been finished yet. If there are plural operations (a block as an above-mentioned generation) about one rest point number (generation), after all the operations with the same rest point number are finished, the copy management processing unit A 220 updates the oldest not-yet-written rest point number.

FIG. 6B shows an example of the own node operation management table 240 or an example of an own node operation management table 440. The own node operation management table 240 will be described as a representative of the above two management tables. The own node operation management table 240 stores operations 242 transmitted from the host to the own node and rest point numbers 241 respectively corresponding to the operations 242. Each of the rest point numbers 241 is the latest rest point number 231 at the time when the relevant operation 242 is received. The operations 242 are respectively (types of) operations that the own node receives from the host 110.

For example, when the own node rest point management table 230 shown in FIG. 6A is referred to, the latest rest point number 231 is "3", and the oldest not-yet-written rest point number 233 is "2". Among operations registered in the own node operation management table 240, an operation (Write (Data A)) corresponding to the rest point number "1" has already been handled (in this case, Data A has been written in the volume 610 of the block storage device 600). Operations (Write (Data C) and Write (Data E)) corresponding to the rest point number "2" are the oldest not-yet-written operations and they are candidates that should be handled the next time. An operation corresponding to the rest point number "3" is the latest operation.

FIG. 6C shows an example of the different node rest point management table 250 or an example of the different node rest point management table 450. The different node rest point management table 250 will be described as a representative of the above two management tables. The different node rest point management table 250 stores the latest rest point number 251 and the oldest not-yet-written rest point number 252 of the different node. Because the latest rest point number 251 and the not-yet-written rest point number 252 are respectively the same as the latest rest point number 231 and the not-yet-written rest point number 232 of the own node rest point management table 230 except that the latest rest point number 251 and the not-yet-written rest point number 252 are associated with the different node, explanations will be omitted.

FIG. 6D shows an example of the different node operation management table 260 or an example of the different node operation management table 460. The different node operation management table 260 will be described as a representative. The different node operation management table 260 stores operations 262 that are received by the different node and rest point numbers 261 respectively corresponding to the operations 262. Because the different node operation management table 260 is the same as the own node operation management table 240 except that the different node operation management table 260 is associated with the different node, an explanation will be omitted. Furthermore, the contents of the different node operation management table 260 are in synchronization (in data-synchronization) with the contents of the own node operation management table 440 managed by the different node (for example, by the node B).

FIG. 7A shows an example of the data save place management table 270 or an example of a data save place management table 470. The data save place management table 270 will be described as a representative. The data save place management table 270 stores the save places of the non-volatile memory data save area 631 of the volume 630 into which data, which is stored in the non-volatile memory 310 of the own node A by the copy management processing unit A 220 of the node A, is saved in preparation for the failure of the own node at the time of the failure of the different node. The data save place management table 270 is set by the management terminal 160. A node name 271 is an identifier used for distinguishing each node. A save data storage volume 272 is a volume used for saving data stored in the non-volatile memory 310 of the node A 200 and in the non-volatile memory 510 of the node B 400. A save data storage path 273 is a path used for saving the data stored in the non-volatile memory 310 of the node A 200 and in the non-volatile memory 510 into a volume.

FIG. 7B shows an example of the node state management table 280 or an example of the node state management table 480. The node state management table 280 will be described as a representative of the above two management tables. The node state management table 280 is a table used for the monitor unit 1230 to record the states of its own node and the different node. A node name 281 is an identifier used for identifying each node. A state 282 is the current state (running state or stopped state) of each node. If there is a stopped node (a node C in FIG. 7B), a taken-over node 283 is a node (the node A in FIG. 7B) that is taking over the operation which was being executed by the stopped node when the stopped node was running. A direct write mode 284 is set ON when data is directly written from the volatile memories 290 and 490 into the block storage device 600 not via the non-volatile memory 510 or the non-volatile memory 310 (off in the figure).

An after-failure recovery mode 285 is the recovery mode of each node that recovers from a failure after data stored in the non-volatile memory of each node is saved into the non-volatile memory save area 631 at the time when the failure occurs. There are three types of recovery modes, that is, a normal recovery mode (FIG. 13), a save area mount recovery mode for the different node (FIG. 14), and a failover recovery mode (FIG. 15), and they will be explained later, but it is conceivable that there are other types of recovery modes. The direct write mode 284 and the after-failure recovery mode 285 are set by the management terminal 160.

Figure 8:
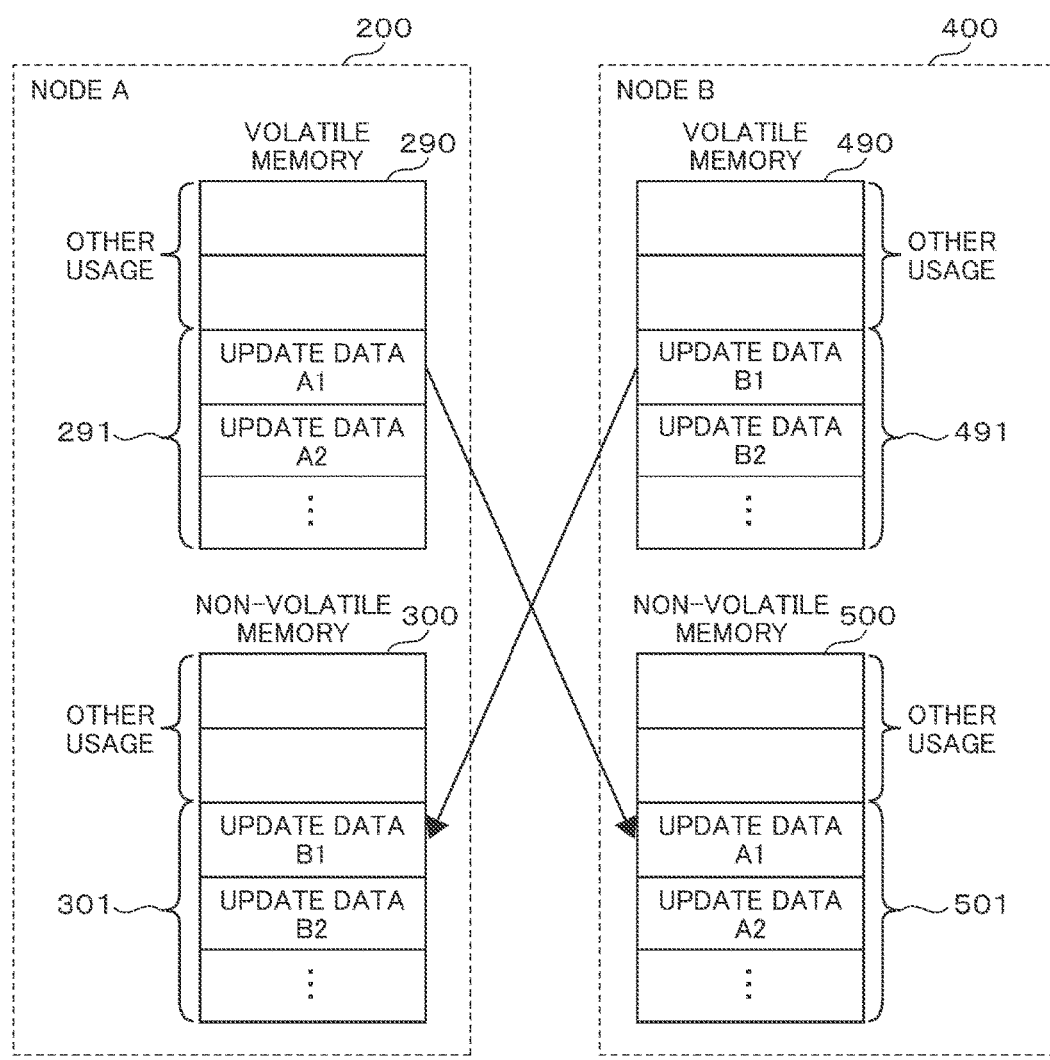
FIG. 8 An example of a way in which a volatile memory and a non-volatile memory of each node hold data.

FIG. 8 shows an example of a way in which each node holds data in the volatile memory and non-volatile memory of its own. The node A 200 copies data in the volatile memory 290 of the node A 200 (update data A1, A2, and so on in FIG. 8) into the non-volatile memory 510 of the node B 400 (the different node (node A) data storage area 501 in the figure), and does not copy the data into the non-volatile memory 300 of the node A 200. As is the case with the node A 200, the node B 400 also copies data in the volatile memory 490 (update data B1, B2, and so on in FIG. 8) into the non-volatile memory 310 of the node A 200 (the different node (node B) data storage area 301 in the figure), and does not copy the data into the non-volatile memory 500 of the node B 400.

Figure 9:
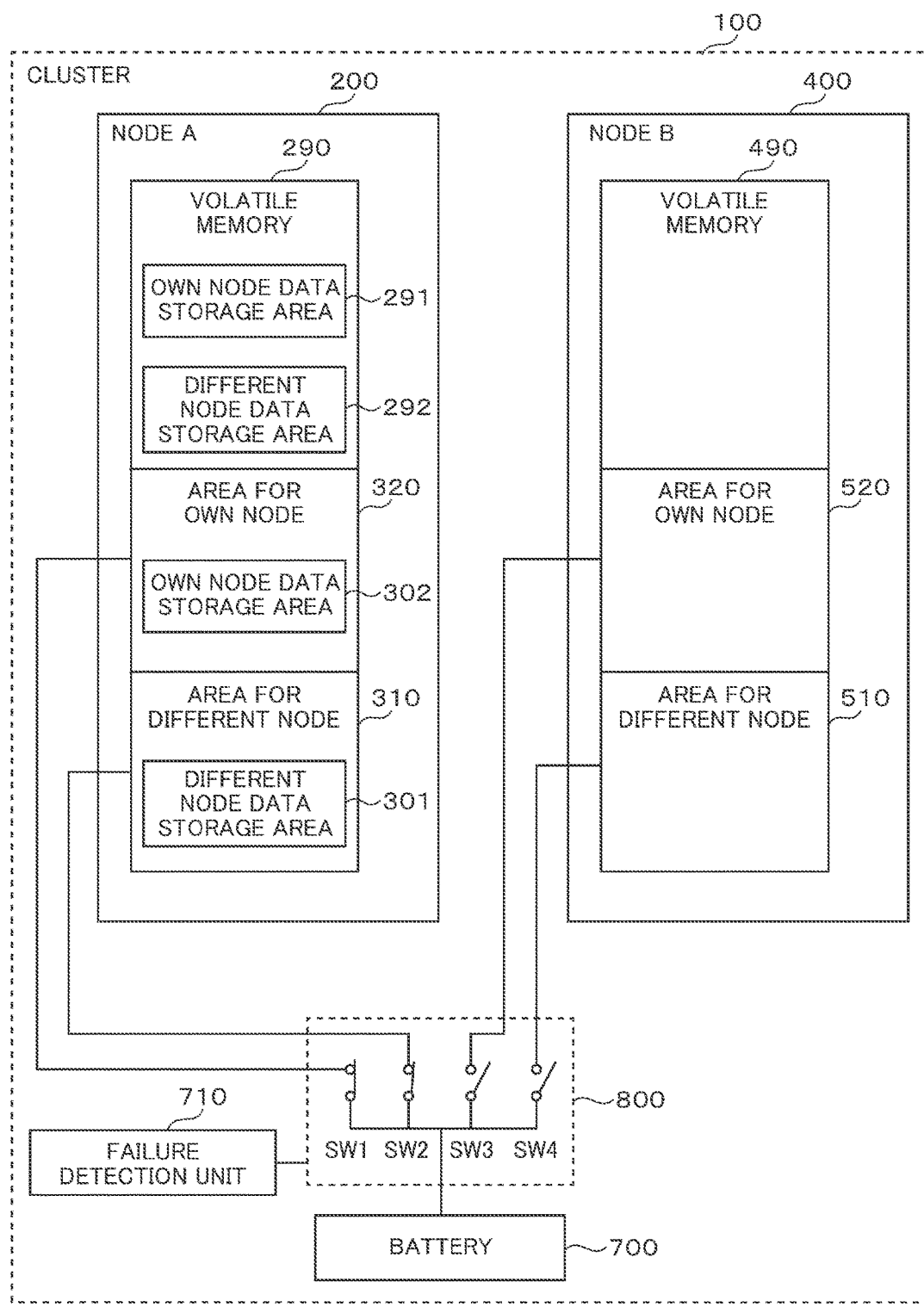
FIG. 9 A configuration example in the case where one node takes over processing of a different node when the different node is broken down.

FIG. 9 shows an example of (the running parts of) the cluster 100. In this case, in association with the failure of the node B 400, SW1 and SW2 of the switch 800 are ON, and SW3 and SW4 are OFF.

When the direct write mode 284 of the node state management table 280 (not shown in FIG. 9) is ON, the update data stored in the own node data storage area 291 are not stored into the area 320 for its own node of the non-volatile memory 300, but written out into the volume 610.

FIG. 9 shows a configuration example in the case where one node (the node A) takes over the processing of the different node (the node B) when the different node is broken down. Hereinafter, the operations when the direct write mode 284 is OFF will be explained. The copy management processing unit A 220 secures an own node data storage area 302 on the area 320 for its own node of the non-volatile memory 300. The copy management processing unit A 200 changes the copy destination of its own node data stored in the own node data storage area 291 from the area 510 for the different node of the non-volatile memory 500 of the node B 400 into the own node data storage area 302 secured on the non-volatile memory 320 of the node A 200.

In addition, the copy management processing unit A 220 of the node A 200 creates a different node data storage area 292 on the volatile memory 290 of the node A 200, and copies data stored in the different node data storage area 301 on the non-volatile memory 300 of the node A 200 into the different node data storage area 292 of the volatile memory 290 of the node A 200. With this, the capacity of the battery 700 can be maximally used, so that it can be expected that the capability of the cluster 100 is improved.

Figure 10:
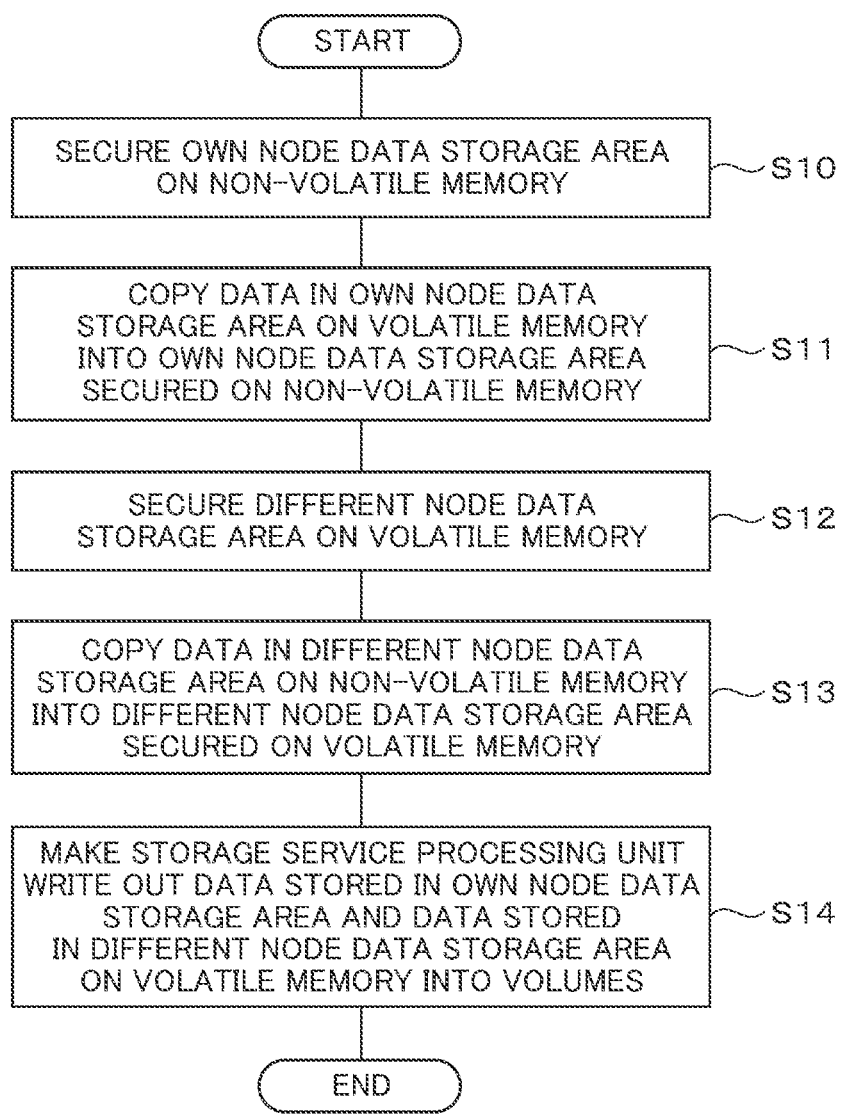
FIG. 10 The processing flowchart of the copy management processing unit of an own node after the failure of the different node is detected.

FIG. 10 is the processing flowchart of the copy management processing unit A 220 of the own node (the node A 200) after the failure of the different node (node B 400) is detected.

The copy management processing unit A 220 secures the own node data storage area 302 on the area 320 for its own node of the non-volatile memory 300 of the own node (node A 200) (S10). The copy management processing unit A 220 copies update data stored in the own node storage area 291 on the volatile memory 290 into the secured own node data storage area 302 (S11).

The copy management processing unit 220 secures the different node data storage area 292 on the volatile memory 290 of the own node (node A 200) (S12). The copy management processing unit 220 copies data stored in the different node data storage area 301 on the area 310 for the different node of the non-volatile memory 300 of the own node (node A 200) into the secured different node data storage area 292 (S13).

The copy management processing unit A 220 makes the storage service processing unit A 210 write out the update data stored in the own node data storage area 291 and the update data stored in the different node data storage area 292 of the volatile memory 290 into the volumes 610 and 620 respectively (S14).

Furthermore, at step S11 and step S13, the own node (node A 200) copies the update data of the own node (node A 200), and tables that are processed by the different node (node B 400) and used for managing update data (the own node (the different node (node B 400)) rest point management table 430, the own node (node B) operation management table 440, the different node (the own node (node A 200)) rest point management table 450, and the different node (the own node (node A 200)) operation management table 460), and takes over processing that has been executed by the different node (node B 400).

Figure 11:
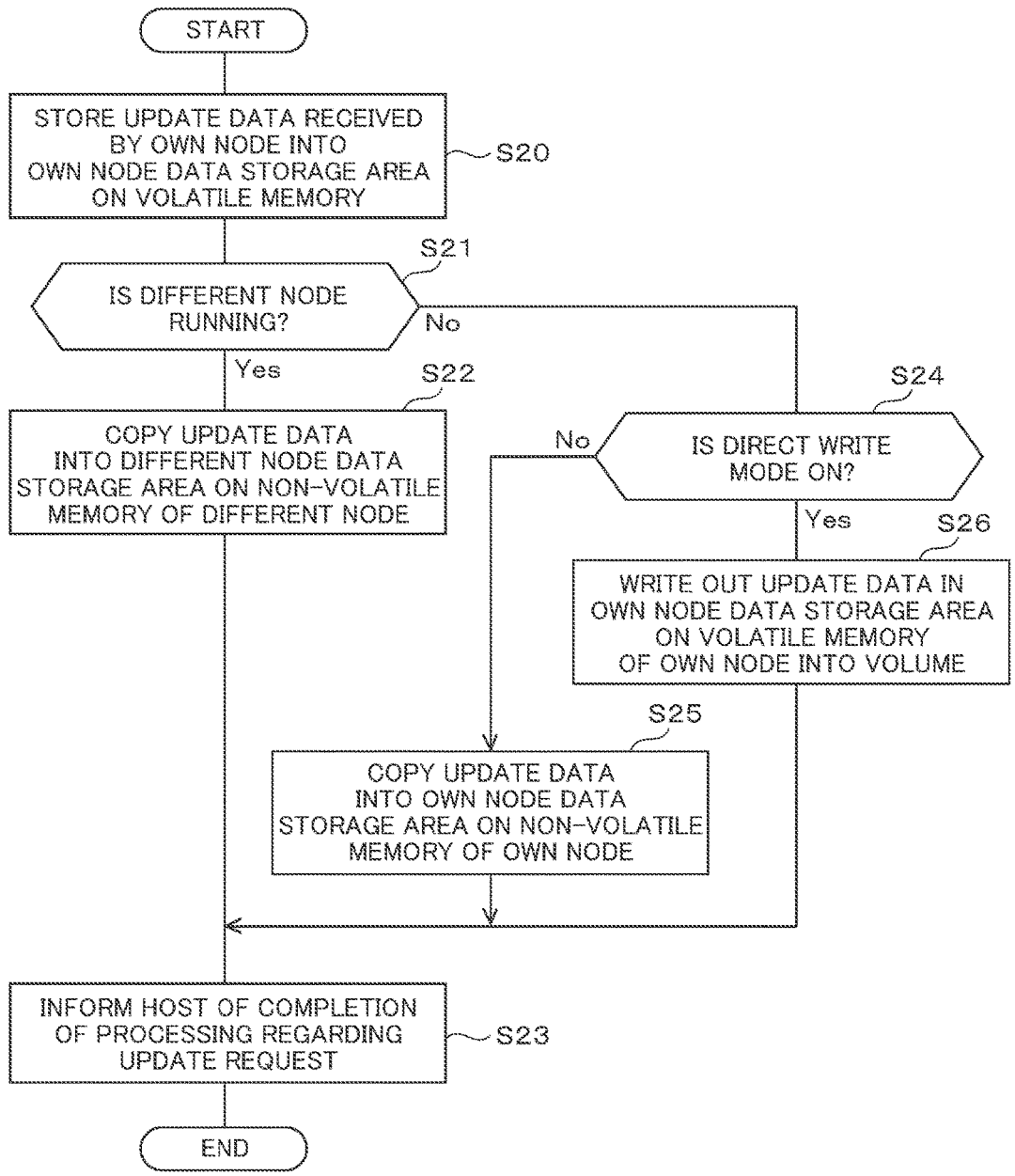
FIG. 11 A processing flowchart after the own node receives an update request.

FIG. 11 is an example of a processing flowchart about processing that is executed by the storage service processing unit A 210 and the copy management processing unit A 220 during the time period after the own node receives a data update request from the host 110 and until the own node informs the host 110 of the completion of processing for the update request. Hereinafter, the case where the own node (node A 200) receives an update request will be described.

The storage service processing unit A 210 stores the received update data into the own node data storage area 291 on the volatile memory 290 (S20). The storage service processing unit A 210 makes the copy management processing unit A 220 execute the following processing. The copy management processing unit A 220 checks whether the different node is running or not with reference to the node name 281 and the state 282 of the node state management table 280 (S21).

If the different node (node B 400) is running, the copy management processing unit A 220 copies the update data into the different node data storage area 501 on the non-volatile memory 500 of the different node (node B 400) (S22). In response to the copy completion executed by the copy management processing unit A 220, the storage service processing unit A 210 informs the host 110 of the completion of the processing (S23).

If the different node (node B 400) is in a stopped state, the copy management processing unit A 220 makes the storage service processing unit A 210 execute the following processes. The storage service processing unit A 210 check whether the direct write mode is ON or OFF with reference to the direct write mode 284 of the node state management table 280 (S24).

If the direct write mode is invalid (OFF), the storage service processing unit A 210 copies the update data into the own node data storage area 302 on the area 320 for its own node of the non-volatile memory 300 of the own node (node A 200) (S25), and informs the host 110 of the completion of the processing (S23).

If the direct write mode is valid (ON), the storage service processing unit A 210 writes out the update data (operation) stored in the own node data storage area 291 on the volatile memory 290 of the own node (node A 200) into the volume 610 (S26), and informs the host 110 of the completion of the processing (S23).

FIG. 12A shows the flowchart of processing executed before the storage service processing unit A 210 informs the host 110 of the completion of the processing, that is, the flowchart of processing in which the copy management processing unit A 220 asynchronously writes out update data on the volatile memory into the volume 610.

The copy management processing unit A 220 refers to the own node operation management table 240, and in any cases where the total data amount of operations reaches a predefined amount, where a predefined time passes since update data is received, and where the copy management processing unit A 220 receives a compulsory write-out request from the host 110 or the management terminal 160 executes an operation, the copy management processing unit A 220 refers to the oldest not-yet-written rest point number 232 of the own node rest point management table 230 so that the rest point number 241 of the own node operation management table 240 becomes equal to the oldest not-yet-written rest point number 232, and the copy management processing unit A 220 writes out the update data into the volume A 610 (S31). In this case, update data (copy data), which is stored in the different node data storage area 501 of the non-volatile memory 510 of the different node (node B 400) and is corresponding to the update data written out into the volume 610, can be deleted.

With reference to the oldest not-yet-written rest point number 232 of the own node rest point management table 230 of the node A 200, the copy management processing unit A 220 checks whether all the operations about the oldest not-yet-written rest point number 241 of the own node operation management table 240 are finished (S32). If all the operations about the oldest not-yet-written rest point number 232 have not been finished yet, the flow goes back to step S31.

If all the operations about the oldest not-yet-written rest point number 232 have been finished, the copy management processing unit A 220 increments the not-yet-written number 232 of the own node rest point management table 230 managed by the node A 200 (S33), and increments the oldest not-yet-written rest point number of the different node rest point management table 450 managed by the node B 400 (S34).

FIG. 12B is an example of a processing flowchart of a redundant processing unit (not shown in FIG. 4) in which, because update data on the relevant volatile memory disappears owing to the running stop of the relevant node, update data on the relevant non-volatile memory is saved into a volume in order to make the update data redundant. Because the non-volatile memory is battery backed-up, the redundancy of the update data is necessary in preparation for a possibility that a power failure, which makes the capacity of the battery underruns its lower limit (is completely discharged), occurs. The redundant processing unit of the node A 200 saves update data on the non-volatile memory 300 into the non-volatile memory data save area 631 of the volume 630 with reference to the data save place management table 270 (S40).

Figure 13:
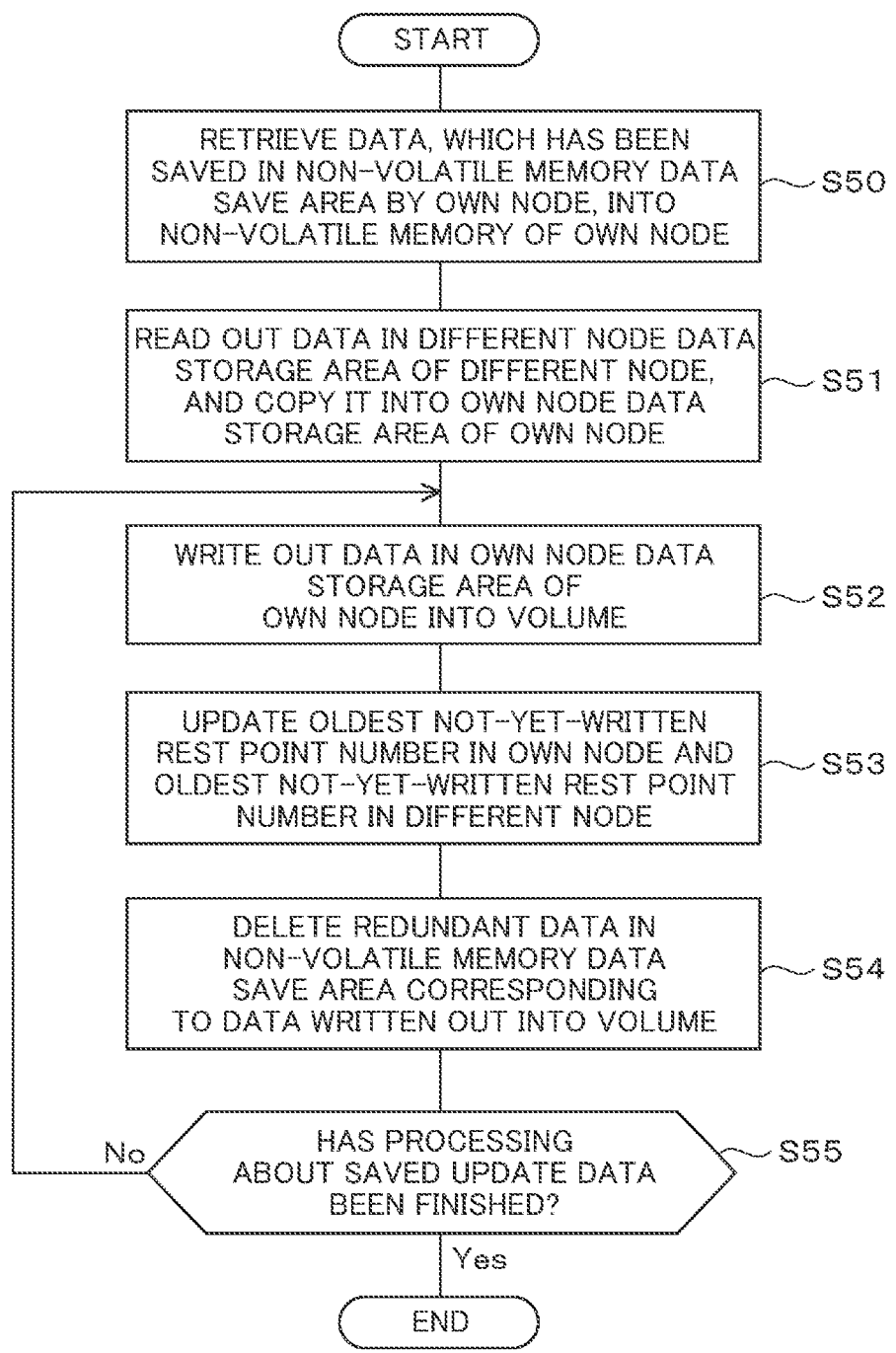
FIG. 13 A flowchart of pieces of recovery processing of data saved in a volume.
Figure 14:
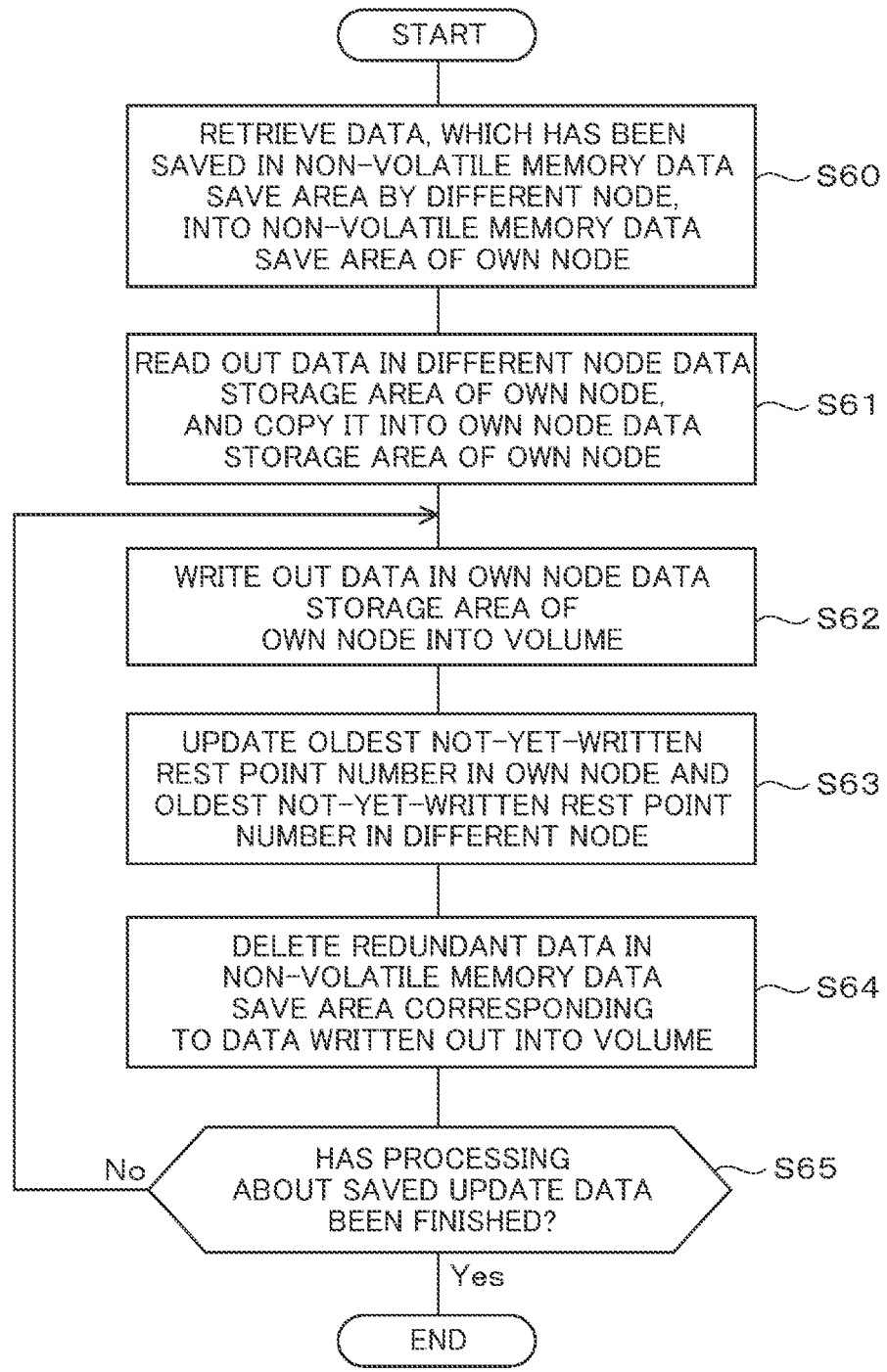
FIG. 14 Another flowchart of pieces of recovery processing of the data saved in the volume.

FIGS. 13 to 15 show the flowcharts of recovery processing after data on the non-volatile memories of all the nodes are saved into the volume 630 when all the nodes stop owing to a power failure or the like. The following descriptions will be made assuming that the own node is the node A 200 and the different node is the node B 400.

FIG. 13 is an example of a processing flowchart of the copy management processing unit 220 A in the case where the recovery mode is the normal recovery mode. The copy management processing unit 220A executes the relevant operation after retrieving update (save) data, which the own node (node A 200) has saved, onto the non-volatile memory 300 of the own node (node A 200), and copying update (save) data, which resides on the non-volatile memory 500 of the different node (node B 400), on the volatile memory 290 of the own node (node A 200).

The copy management processing unit A 220 retrieves data (update data of the node B 400), which has been saved in the non-volatile memory save area 631 on the volume 630 by the node A 200, into the different node data storage area 301 of the non-volatile memory 300 of the node A 200. Similarly at the node B 400, the copy management processing unit B 400 retrieves save data (update data of the node A 200) onto the different node data storage area 501 of the non-volatile memory 500 (S50).

The copy management processing unit A 220 reads out the data (update data of the node A 200) from the different node data storage area 501 on the non-volatile memory 500 of the node B 400, and copies the read-out data into the own node data storage area 291 of the volatile memory 290 of the node A 200 (S51). The copy management processing unit A 220 executes the operation of the update (save) data of the own node data storage area 291 on the volatile memory 290, and writes out the obtained result into the volume A 610 (S52).

The copy management processing unit A 220 updates the oldest not-yet-written rest point number 232 of the own node rest point management table 230 of the node A 200 and the oldest not-yet-written rest point number of the different node rest point management table 450 of the node B 400 (S53). The copy management processing unit A 220 deletes the data (redundant data) that is corresponding to the data written out into the volume A 610 and has been saved in the non-volatile memory data save area 631 of the volume 630 (S54).

The copy management processing unit A 220 checks whether processing about all the update data has been finished or not (S55). If the processing about all the update (save) data has been finished, the copy management processing unit A 220 finishes the recovery processing. If the processing about all the update data has not been finished, the flow goes back to step S52.

FIG. 14 is an example of a processing flowchart of the copy management processing unit 220 A in the case where the recovery mode is the save area mount recovery mode for the different node. The copy management processing unit 220A executes the relevant operation after retrieving update (save) data, which the different node (node B 400) has saved, onto the non-volatile memory 300 of the own node (node A 200), and copying update (save) data, which resides on the non-volatile memory 300 of the own node (node A 200), on the volatile memory 290 of the own node (node A 200).

The copy management processing unit A 220 of the node A 200 retrieves data (update data of the node A 200), which has been saved in the non-volatile memory data save area 631 on the volume 630 by the node B 400, into the different node data storage area 301 of the non-volatile memory 300 of the node A 200. Similarly at the node B 400, save data (update data of the node B 400) is retrieved onto the non-volatile memory 500 (S60). The copy management processing unit A 220 reads out the data (update data of the node A 200) from the different node data storage area 301 on the non-volatile memory 300 of the node A 200, and copies the read-out data into the own node data storage area 291 of the volatile memory 290 of the node A 200 (S61). Because the following processing at steps S62 to S65 is the same as the processing at steps S52 to S55, explanations about processing at steps S62 to S65 will be omitted.

FIG. 15 is an example of a processing flowchart of the copy management processing unit 220 A in the case where the recovery mode is the failover recovery mode. The copy management processing unit 220A performs a failover from the own node to the different node, and executes the relevant operation after retrieving update (save) data, which the own node (node A 200) has saved, into the non-volatile memory 300 of the own node (node A 200).

The copy management processing unit A 220 of the node A 200 retrieves data (update data of the node B 400), which has been saved in the non-volatile memory data save area 631 on the volume 630 by the node A 200, into the different node data storage area 301 of the non-volatile memory 300 of the node A 200. Similarly at the node B 400, save data (update data of the node A 200) is retrieved into the different node data storage area 501 on the non-volatile memory 500 (S70).

A failover from the own node (node A 200) to the different node (node B 400) is performed (S71). Furthermore, a failover from the different node (node B 400) to the own node (node A 200) is performed.

The copy management processing unit A 220 reads out the save data (update data of the node B 400) from the different node data storage area 301 on the non-volatile memory 300 of the node A 200, and copies the read-out data into the own node data storage area 291 of the volatile memory 290 of the node A 200 (S72).

The copy management processing unit A 220 executes the operation of the save data (update data of the node B 400) of the own node data storage area 291 on the volatile memory 290, and writes out the obtained result into the volume B 620 (S73). The copy management processing unit A 220 updates the oldest not-yet-written rest point number of the own node rest point management table 430 of the node B 400 and the oldest not-yet-written rest point number 252 of the different node rest point management table 250 of the node A 200 (S74).

The copy management processing unit A 220 deletes the data that is corresponding to the data written out into the volume B 620 and has been saved in the non-volatile memory data save area 631 of the volume 630 (S75). Similarly at the node B 400, the save data (update data of the node A 400) is written out into the volume A 620, and save data of the non-volatile memory data save area 631 of the volume 630 is deleted.

Whether all the update (save) data has been deleted or not is checked (S77). If the processing about all the save data has not been finished, the flow goes back to step S73. If the processing about all the update (save) data has been finished, the copy management processing unit A 220 performs a failback from the own node (node A 200) to the different node (node B 400) (S78), and finishes the recovery processing. In addition, a failback from the different node (node B 400) to the own node (node A 200) is also performed.

Second Embodiment

Figure 16:
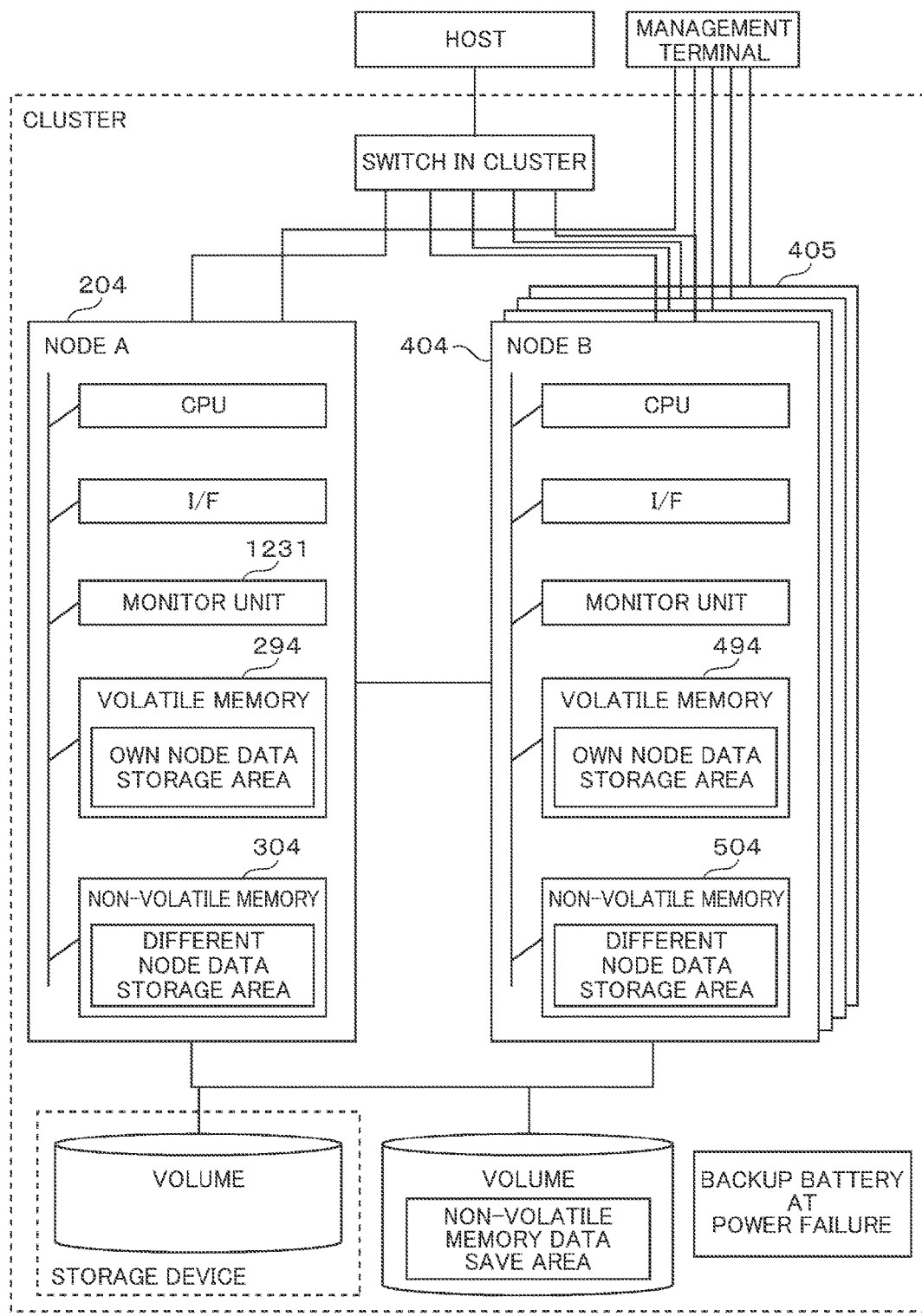
FIG. 16 A schematic block diagram showing a storage system of a second embodiment.

FIG. 16 is a schematic block diagram showing a storage system with a cluster structure comprised of three nodes or more. Because the fundamental operations are similar to the first embodiment, the main points of the operations different from the first embodiment will be explained hereinafter.

The storage system of the cluster structure includes a node A 204, a node B 404, and further includes a node 405 other than the node A 204 and the node B 404, and the structures of the individual nodes are similar to each other.

Figure 17:
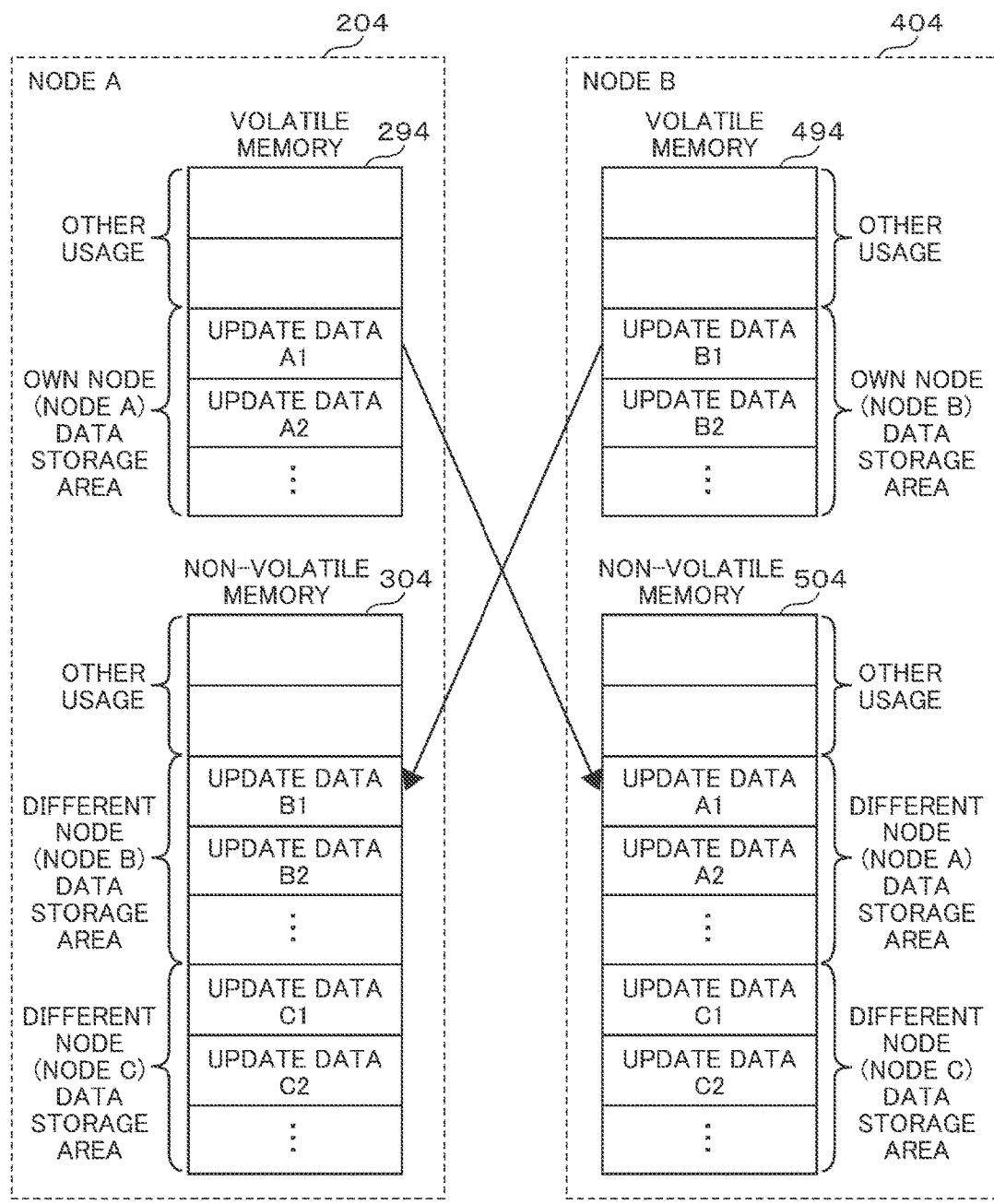
FIG. 17 A diagram showing a way in which a node stores data of a different node on the non-volatile memory of its own.
Figure 18:
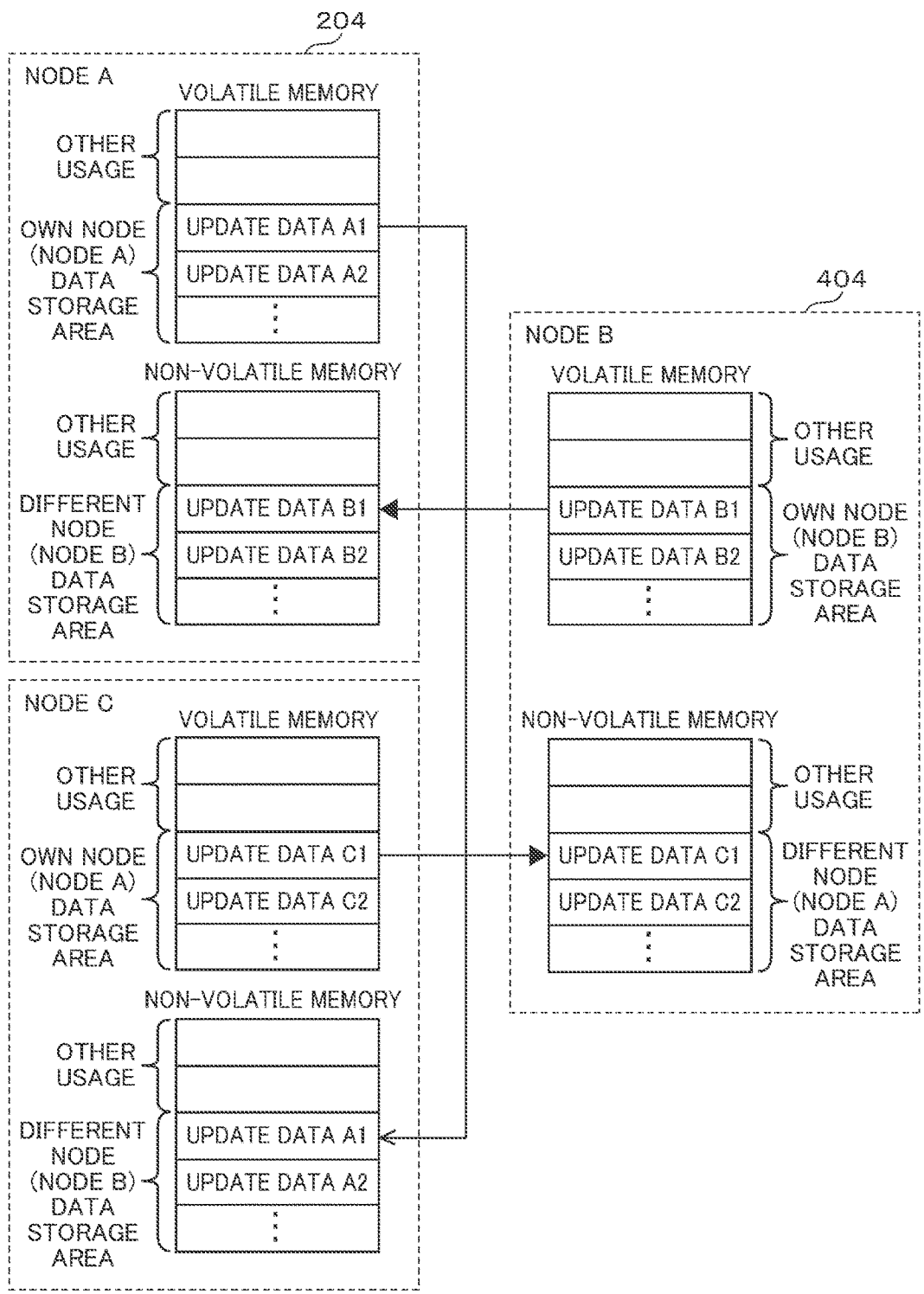
FIG. 18 A diagram showing another way in which the node stores the data of the different node on the non-volatile memory of its own.

FIGS. 17 and 18 are diagrams showing how for each node to store data of another node on the non-volatile memory of its own. FIG. 17 shows how for each node to copy and store data stored on the volatile memories of all the nodes other than itself onto the non-volatile memory of its own. FIG. 18 shows a ring-shaped storage method in which each node copies and stores data of the volatile memory of another node.

Figure 19:
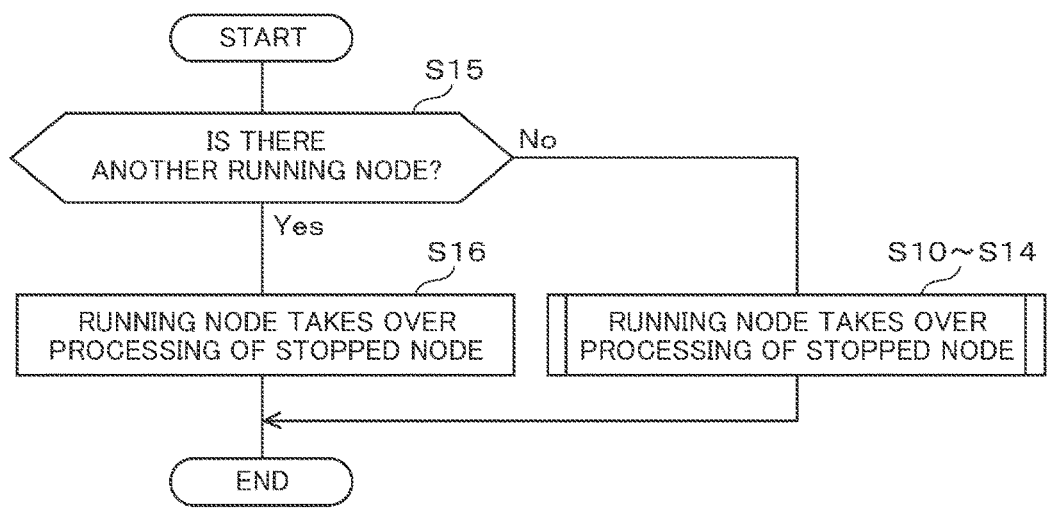
FIG. 19 The processing flowchart of a copy management processing unit in the case where some of nodes stop.

FIG. 19 is an example of a processing flowchart of a copy management processing unit in the case where some of the nodes stop. In the storage system of the two-node structure of the first embodiment, it was necessary for an own node to take over processing of the different node in response to the stoppage of the different node. In the storage system of the structure of this embodiment, only if all the nodes other than an own node stop, it becomes necessary for the own node to continue processing of all the nodes other than the own node after taking over the processing. In the case where some of the nodes other than the own node stop, a strategy adopted in this embodiment is different from that adopted in the first embodiment. The following explanations will be made assuming that the own node is the node A 204.

A monitor unit 1231 of the node A 204 detects the failure of one of other nodes. In response to the detection of the failure of one of the other nodes, a copy management processing unit of the node A 204 checks whether there is another node that is running with reference to a node state management table 280 (S15). If there is not another node that is running, the copy management processing unit executes the own node processing (S10 to S14 shown in FIG. 10) after the detection of the failure of the different node in the first embodiment. If there is another node that is running, the other node that is running takes over the processing of the one of the other nodes that is in a failure state (S16). The way the processing of the one of the nodes that is in the failure state is taken over is the same as the own node processing (S10 to S14 shown in FIG. 10) after the detection of the failure of the one of the other nodes.

Third Embodiment

Figure 20:
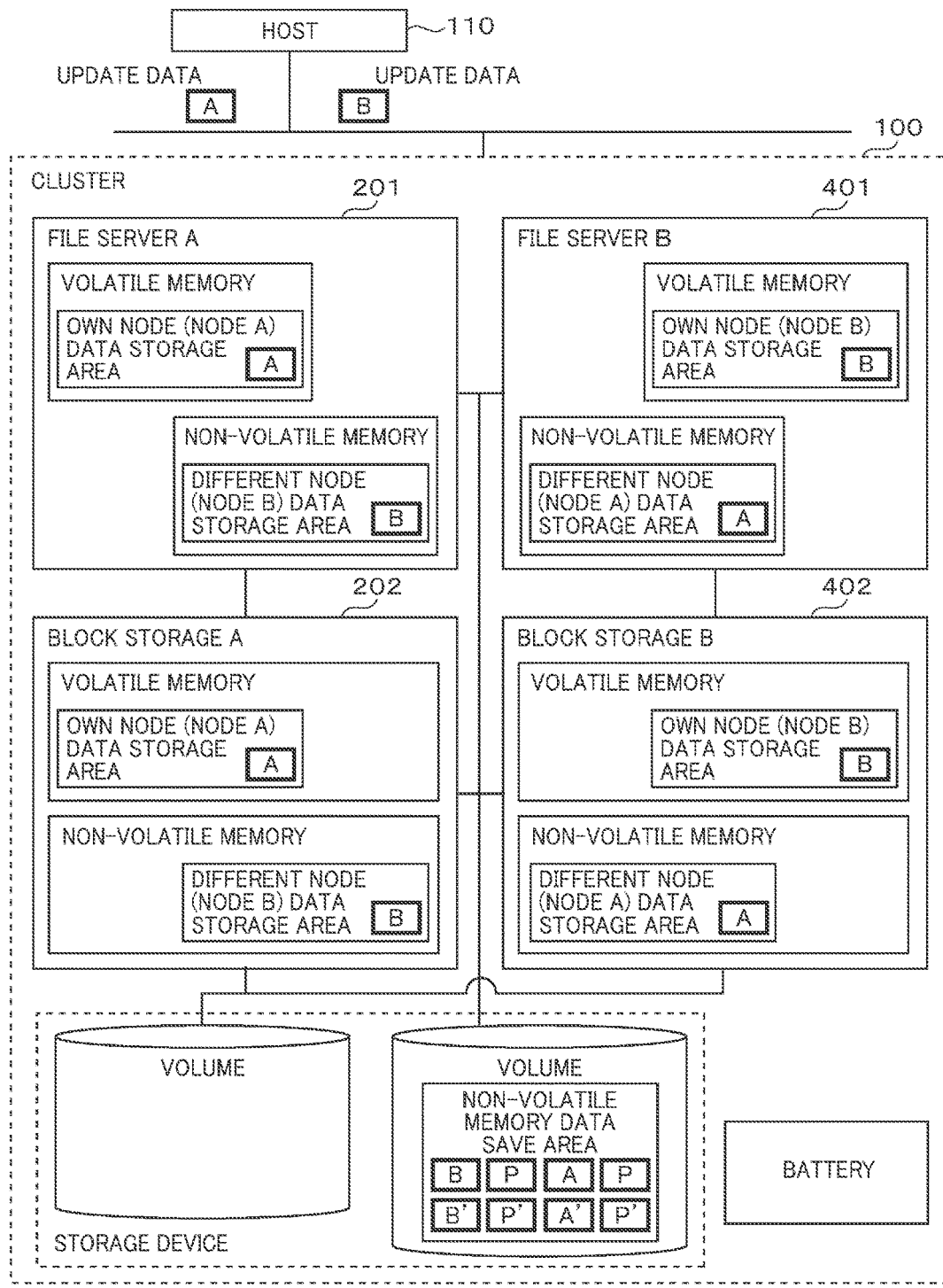
FIG. 20 The schematic block diagram of a storage system comprised of multistage-structure nodes including file servers and block storages according to a third embodiment.

FIG. 20 is the schematic block diagram of a storage system comprised of multistage-structure nodes including file servers and block storages. Hereinafter, although, as is the case of the first embodiment, a storage system of a two-node structure will be explained, it is conceivable that a storage system of a three or more-node structure operates similarly to the storage system of a two-node structure. Because the fundamental operations of the third embodiment are similar to the first embodiment or the second embodiment, the main points of the operations of the third embodiment different from the first embodiment or the second embodiment will be explained hereinafter.

FIG. 20 shows a storage system of a structure in which file servers and block storages are connected with each other instead of the nodes connected with each other in the first embodiment. A combination of a file server A 201 and a file server B 401 operates in the same way as a combination of the node A 200 and the node B 400 of the first embodiment does. Furthermore, the block storage A 202 and the block storage B 402 store the data update request from the file server in a different node data storage area of a non-volatile memory of the different node after storing the data update request in a volatile memory. The update data included in the update requests are asynchronously written out into a storage device as is the case with the first embodiment. As mentioned above, the block storage also operates in the same way as the file servers do.

Figure 21:
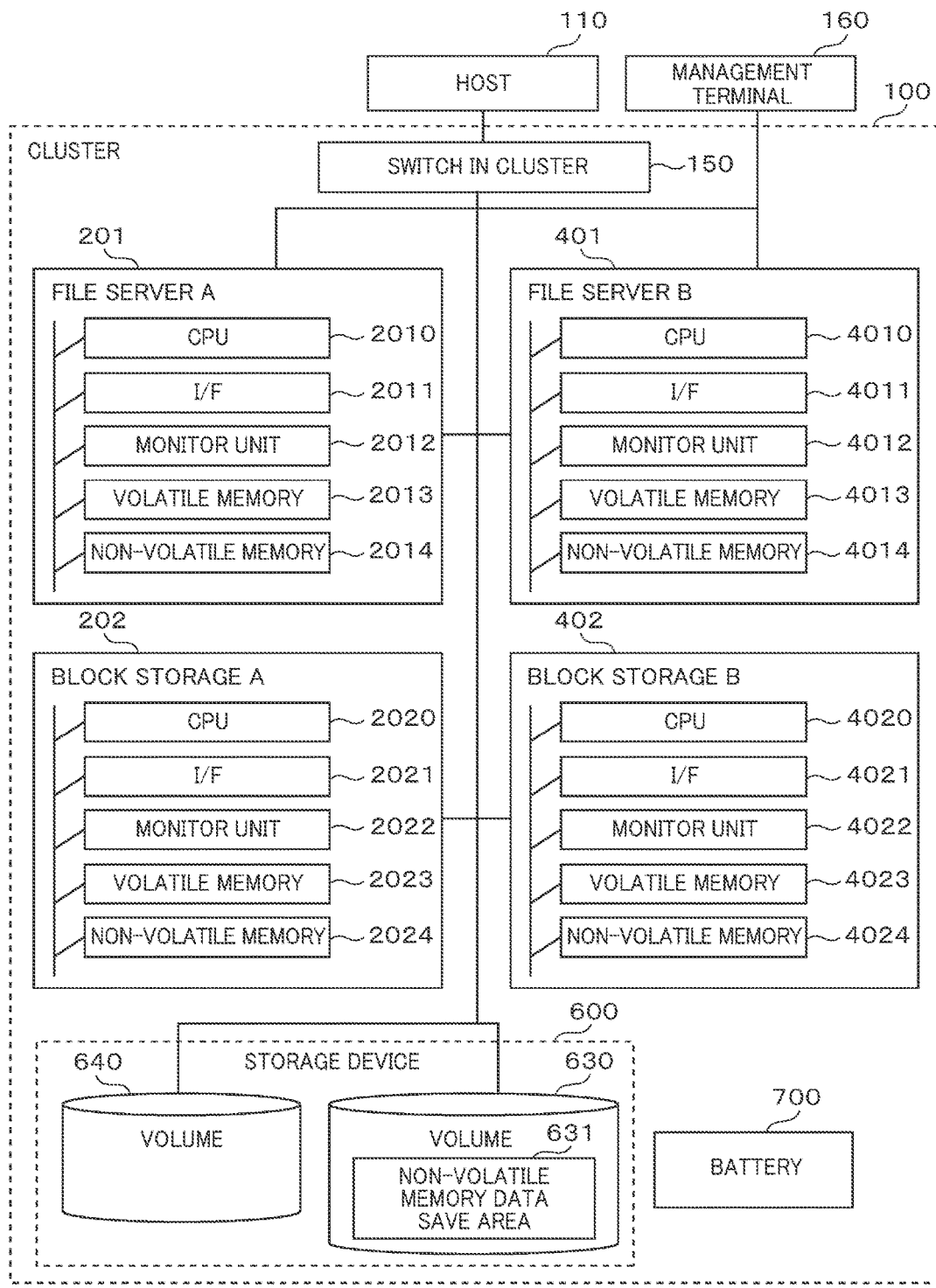
FIG. 21 A hardware block diagram of the storage system.

FIG. 21 is a hardware block diagram of the storage system. The main points of the hardware configuration different from the first embodiment will be explained hereinafter. The file storage A 201 is a computer that receives a data update request from a host 110 and writes out the received data update request into the block storage A 202 or the block storage B 402. A CPU 2010 activates a processing unit stored in a volatile memory 2013 or a non-volatile memory 2014. An I/F 2011 is a mediator through which data is sent or received among computers in the host 110, a switch 150 in the cluster, the file server B 401, the block storage A 202, the block storage B 402, the storage device 600, and the like. A monitor unit 2012 detects the states (running states or stopped states) of the file server A 201, the file server B 402, the block storage A 202, and the block storage B 402, and stores the detected states in a node state management table 280. The monitor unit 2012 of the file server A 202 and a monitor unit 4012 of the file server B 401 manage each other's state using the node state management tables 280 and 480 of their own respectively. The volatile memory 2013 or the non-volatile memory 2014 stores processing units and tables used for providing storage services. The stored processing units and tables are the same as the above-described embodiments.

The file server B 401 and the file server A 201 are paired with each other. The block storage A 202 and the block storage B 402 are also paired with each other as is the case of the file server A 201 and the file server B 202.

A management terminal 160 is a terminal that obtains management information about the file server A 201, the file server B 401, the block storage A 202, and the block storage B 402 as needed, and handles them, and it is a kind of computer including an I/F used for connecting with a network and an input/output device used for handling.

The storage device 600 stores data in accordance with directions from the file server A 201, the file server B 401, the block storage A 202, the block storage B 402, the host 110, and the management terminal 160. Therefore, the storage device 600 includes a single volume 640 or plural volumes 640 used for storing data. In addition, the storage device 600 includes a volume 630 and a non-volatile memory data save area 631 that are used for saving various data including tables on non-volatile memories of the file server A 201, the file server B 401, the block storage A 202, and the block storage B 402 when a power failure or the like occurs.

Fourth Embodiment

This embodiment has a configuration which is equal to the configuration of the first to third embodiments except that the non-volatile memories of this embodiment are not battery backed-up volatile memories. Because the fundamental operation of this embodiment is similar to that of the first to third embodiments, only different points will be explained hereinafter. In this embodiment, because update data remains on the non-volatile memories, it is not necessary to execute the save processing for saving the update data into the non-volatile memory data save area 631 when the failure shown in FIG. 4 occurs. Furthermore, in this embodiment, when one of the two nodes is broken down, it is impossible to increase the amount of a non-volatile memory by increasing the amount of a battery backed-up area unlike the case shown in FIG. 9 or FIG. 10. Therefore, in the case where one of the nodes is broken down and a failover to a different node is performed, the storage service processing unit B 410 and the copy management processing unit B 420 always operate in the direct write mode. As described above about this embodiment, it is sufficient for each of the nodes forming the cluster to include a non-volatile memory for storing the data of the different node. In addition, in the case where a non-volatile memory battery backs up a volatile memory, the capacity of the battery can be reduced.

LIST OF REFERENCE SIGNS

100: Cluster,
200: Node A,
290: Volatile Memory,

300: Non-volatile Memory,
400: Node B,
490: Volatile Memory,
500: Non-volatile Memory,
600: Storage Device,
700: Battery,
710: Failure Detection Unit

The invention claimed is:

1. A storage system comprising a node and a different node coupled to the node,
  wherein the node includes a memory, having a volatile memory and a non-volatile memory, for storing first update data from a host and for storing second update data sent from the host to the different node, a replication management processing unit for storing the first update data in a non-volatile memory of said different node, and a storage service processing unit for transmitting a response to an update request of the first update data to the host,
  wherein the node, stores the first update data in said volatile memory,
  wherein, when the different node is in a non-operating state, the node stores the first update data stored in the volatile memory of the node to the non-volatile memory of the node or a storage device coupled to the node, and sends the response to the host, and
  wherein, when the different node is in an operating state, the node stores the first update data stored in said volatile memory to the non-volatile memory of said different node, sends the response to the host, and stores the first update data in the storage device without storing the first update data in the non-volatile memory of the node.

2. The storage system according to claim 1, wherein the storage system is capable of changing the volatile memory to the non-volatile memory by battery backup, and
  when the storage system detects the different node is not in operation, the storage system increases the non-volatile memory of the node by the battery backup.

3. A storage system comprising a node and a different node coupled with the node,
  the node includes, a memory having a volatile memory and a non-volatile memory, for storing a first update data from a host and for storing second update data from the host to the different node,
  a replication management processing unit for storing the first update data in a non-volatile memory of said different node, and
  a storage service processing unit for transmitting a response to the update request of the first update data to the host,
  wherein the node:
  stores the first update data in the volatile memory,
  in case where the different node is in a non-operating state, stores the first update data stored in the volatile memory to the non-volatile memory of the node, and sends the response to the host,
  in case where a failure occurs in the node before storing the first update data to a storage device coupled to the node, after returning normal state, stores the first update data stored in the non-volatile memory of the node to the storage device,
  in case where the different node is in an operating state, stores the first update data stored in the volatile memory to the non-volatile memory of the different node, sends the response to the host,
  in case where a failure occurs in the node before storing the first update data to the storage device, stores the first update data stored in the different node to the storage device.

4. A storage method in a storage system having a node and a different node coupled to the node, the node including a memory having a volatile memory and a non-volatile memory, the storage method comprising:
  storing, by the node, first update data of an update request from a host in the volatile memory of the node;
  storing, by the node, second update data sent from the host to the different node;
  when the different node is in a non-operating state, storing, by the node, the first update data stored in the volatile memory of the node to the non-volatile memory of the node or a storage device coupled to the node, and sending a response to the update request to the host; and
  when the different node is in an operating state, storing, by the node, the first update data stored in a non-volatile memory to the non-volatile memory of said different node, sending the response to the host, and storing the first update data in the storage device without storing the first update data in the non-volatile memory of the node.

5. The storage method according to claim 4, wherein the storage system is capable of changing the volatile memory to the non-volatile memory by battery backup, and
  when the storage system detects the different node is not in the operating state, the storage system increases the non-volatile memory of the node by the battery backup.

6. A storage method in a storage system having a node and a different node coupled with the node, the node including a memory having a volatile memory and a non-volatile memory, the storage method comprising:
  storing, by the node, first update data of an update request from a host in the volatile memory of the node;
  storing, by the node, second update data sent from the host to the different node;
  in case where the different node is in a non-operating state, storing, by the node, the first update data stored in the volatile memory to the non-volatile memory of the node, and sending a response to the update request to the host;
  in case where a failure occurs in the node before storing the first update data to a storage device coupled to the node, storing, after the node returns to a normal state, the first update data stored in the non-volatile memory of the node to the storage device,
  in case where the different node is in an operating state, storing, by the first node, the first update data stored in the volatile memory to a non-volatile memory of the different node, and sending the response to the host,
  in case where a failure occurs in the node before storing the first update data to the storage device, storing, by the node, the first update data stored in the different node to the storage device.

* * * * *